(12) United States Patent
Ahn et al.

(10) Patent No.: US 12,505,500 B2
(45) Date of Patent: Dec. 23, 2025

(54) METHOD AND APPARATUS FOR GENERATING LANDMARK

(71) Applicant: Hyperconnect LLC, Seoul (KR)

(72) Inventors: Sang Il Ahn, Cheongju-si (KR); Seok Jun Seo, Seoul (KR); Hyoun Taek Yong, Seoul (KR); Sung Joo Ha, Seongnam-si (KR); Martin Kersner, Seoul (KR); Beom Su Kim, Seoul (KR); Dong Young Kim, Incheon (KR)

(73) Assignee: Hyperconnect LLC, Dallas, TX (US)

( * ) Notice: Subject to any disclaimer, the term of this patent is extended or adjusted under 35 U.S.C. 154(b) by 417 days.

(21) Appl. No.: 17/658,623

(22) Filed: Apr. 8, 2022

(65) Prior Publication Data

US 2022/0253970 A1    Aug. 11, 2022

Related U.S. Application Data

(63) Continuation-in-part of application No. 17/092,486, filed on Nov. 9, 2020, now abandoned.

(30) Foreign Application Priority Data

| Nov. 7, 2019 | (KR) | 10-2019-0141723 |
| Dec. 30, 2019 | (KR) | 10-2019-0177946 |
| Dec. 31, 2019 | (KR) | 10-2019-0179927 |
| Feb. 25, 2020 | (KR) | 10-2020-0022795 |

(51) Int. Cl.
  *G06T 3/00* (2024.01)
  *G06V 40/16* (2022.01)

(52) U.S. Cl.
  CPC .............. *G06T 3/00* (2013.01); *G06V 40/171* (2022.01)

(58) Field of Classification Search
  None
  See application file for complete search history.

(56) References Cited

U.S. PATENT DOCUMENTS

| 7,168,953 B1 | 1/2007 | Poggio et al. |
| 7,564,476 B1 | 7/2009 | Coughlan et al. |
| 8,373,799 B2 | 2/2013 | Reponen et al. |
| 8,947,491 B2 | 2/2015 | Rosenberg |
| 9,282,287 B1 | 3/2016 | Marsh |
| 9,445,048 B1 | 9/2016 | Nariyawala et al. |

(Continued)

FOREIGN PATENT DOCUMENTS

| CN | 1411277 A | 4/2003 |
| JP | 2002525764 A | 8/2002 |

(Continued)

OTHER PUBLICATIONS

Communication issued by Korean Patent Office in Application No. 10-2019-0141723, Dated Aug. 26, 2020, 9 Pgs.

(Continued)

*Primary Examiner* — Soo Shin
(74) *Attorney, Agent, or Firm* — Patent Capital Group

(57) ABSTRACT

Provided is a method of transforming a landmark including: receiving an input image including a facial image of a first person and a landmark corresponding to the facial image; estimating a transformation matrix corresponding to the landmark; and calculating an expression landmark and an identity landmark corresponding to the input image by using the transformation matrix.

20 Claims, 18 Drawing Sheets

Target Image (1310)

Driver Image (1320)

Reenacted Image (1330)

(56) References Cited

U.S. PATENT DOCUMENTS

| | | | |
|---|---|---|---|
| 9,531,998 B1 | 12/2016 | Farrell et al. | |
| 10,044,982 B2 | 8/2018 | Wilson et al. | |
| 10,218,937 B2 | 2/2019 | Wang | |
| 10,565,758 B2 | 2/2020 | Hadap et al. | |
| 10,565,790 B2 | 2/2020 | Kaehler | |
| 10,602,091 B2 | 3/2020 | Ahn et al. | |
| 10,728,499 B2 | 7/2020 | Ahn et al. | |
| 10,750,102 B2 | 8/2020 | Ahn | |
| 10,789,453 B2 | 9/2020 | Savchenkov et al. | |
| 11,163,359 B2 | 11/2021 | Bott et al. | |
| 2003/0058939 A1 | 3/2003 | Lee et al. | |
| 2004/0015495 A1* | 1/2004 | Kim | G06V 10/7715 |
| 2004/0257431 A1 | 12/2004 | Girish et al. | |
| 2005/0083399 A1 | 4/2005 | Shinkai | |
| 2006/0259552 A1 | 11/2006 | Mock et al. | |
| 2007/0046662 A1* | 3/2007 | Kawakami | G06V 40/169 |
| | | | 345/419 |
| 2007/0216675 A1 | 9/2007 | Sun et al. | |
| 2009/0002479 A1 | 1/2009 | Sangberg et al. | |
| 2009/0135198 A1 | 5/2009 | Lee et al. | |
| 2010/0118109 A1 | 5/2010 | Sakai et al. | |
| 2010/0189355 A1 | 7/2010 | Tanaka et al. | |
| 2011/0018961 A1 | 1/2011 | Choi et al. | |
| 2011/0300931 A1 | 12/2011 | Kitahara | |
| 2012/0206560 A1 | 8/2012 | Setton | |
| 2012/0237117 A1* | 9/2012 | Liu | G06V 40/161 |
| | | | 382/197 |
| 2013/0141515 A1 | 6/2013 | Setton | |
| 2013/0230251 A1 | 9/2013 | Kondo et al. | |
| 2013/0312041 A1 | 11/2013 | Gresta | |
| 2014/0139609 A1 | 5/2014 | Lu et al. | |
| 2014/0362163 A1 | 12/2014 | Winterstein et al. | |
| 2015/0156248 A1 | 6/2015 | Rao et al. | |
| 2016/0335774 A1 | 11/2016 | Hsieh et al. | |
| 2017/0235975 A1 | 8/2017 | Iwanami et al. | |
| 2017/0312614 A1 | 11/2017 | Tran et al. | |
| 2018/0068178 A1 | 3/2018 | Theobalt et al. | |
| 2018/0158246 A1 | 6/2018 | Grau et al. | |
| 2018/0330152 A1 | 11/2018 | Mittelstaedt et al. | |
| 2018/0336714 A1 | 11/2018 | Stoyles et al. | |
| 2018/0365874 A1 | 12/2018 | Hadap et al. | |
| 2019/0035149 A1* | 1/2019 | Chen | G06V 40/166 |
| 2019/0082122 A1 | 3/2019 | Singh et al. | |
| 2019/0122412 A1 | 4/2019 | Woo et al. | |
| 2019/0132550 A1 | 5/2019 | Ahn et al. | |
| 2019/0222775 A1 | 7/2019 | Ahn | |
| 2019/0297301 A1 | 9/2019 | Ahn et al. | |
| 2020/0013195 A1 | 1/2020 | Kim et al. | |
| 2020/0162679 A1 | 5/2020 | Ahn et al. | |
| 2020/0234034 A1 | 7/2020 | Savchenkov et al. | |
| 2020/0236297 A1 | 7/2020 | Shaburov et al. | |
| 2021/0104086 A1 | 4/2021 | Wang et al. | |
| 2021/0142440 A1 | 5/2021 | Ahn et al. | |
| 2021/0279956 A1 | 9/2021 | Chandran et al. | |
| 2021/0289166 A1 | 9/2021 | Ahn et al. | |
| 2022/0237945 A1 | 7/2022 | Ahn et al. | |

FOREIGN PATENT DOCUMENTS

| | | | |
|---|---|---|---|
| JP | 2003219383 A | 7/2003 | |
| JP | 2005056388 A | 3/2005 | |
| JP | 2005124161 A | 5/2005 | |
| JP | 2005322969 A | 11/2005 | |
| JP | 2006050370 A | 2/2006 | |
| JP | 2006270380 A | 10/2006 | |
| JP | 2008310775 A | 12/2008 | |
| JP | 2010271955 A | 12/2010 | |
| JP | 2013228765 A | 11/2013 | |
| JP | 2014532330 A | 12/2014 | |
| JP | 2015525496 A | 9/2015 | |
| JP | 2018200690 A | 12/2018 | |
| KR | 20040046906 A | 6/2004 | |
| KR | 20080044379 A | 5/2008 | |
| KR | 20090093528 A | 9/2009 | |
| KR | 20100088347 A | 8/2010 | |
| KR | 20100111930 A | 10/2010 | |
| KR | 20110045942 A | 5/2011 | |
| KR | 101172268 B1 | 8/2012 | |
| KR | 20120137826 A | 12/2012 | |
| KR | 20130071341 A | 6/2013 | |
| KR | 20130101823 A | 9/2013 | |
| KR | 20140043939 A | 4/2014 | |
| KR | 20160012256 A | 2/2016 | |
| KR | 20170047167 A | 5/2017 | |
| KR | 20190038203 A | 4/2019 | |
| KR | 20190093759 A | 8/2019 | |
| WO | 2016072118 A1 | 5/2016 | |
| WO | 2017084483 A1 | 5/2017 | |

OTHER PUBLICATIONS

Office Action for Korean Patent Application No. 10-2019-0179927, Dec. 31, 2019, 5 pgs.

Office Action for Korean Patent Application No. 10-2019-0177946, Dec. 30, 2019, 6 pgs.

Blanz et al., "Reanimating faces in images and video", Eurographics, Sep. 2003, vol. 22, No. 3, 10 pgs.

Ha et al., "MarioNETte: Few-shot Face Reenactment Preserving Identity of Unseen Targets", arXiv: 1911.08139v1, [cs.CV], Nov. 19, 2019, 8 pgs.

Extended European Search Report for European Application No. 18203915.6, Search completed Feb. 28, 2019, Mailed Mar. 7, 2019, 8 pgs.

First Office Action for corresponding Korean Patent Application No. 10-2017-0145497, mailed Jun. 25, 2019, 14 pgs.

First Office Action issued in corresponding Japanese Application No. 2018-207367, mailed Sep. 19, 2019, 12 pgs.

Notice of Allowance for Japan Patent Application No. 2020-185991, mailed Sep. 26, 2024, 2 pgs.

Notice of Allowance for Korean Patent Application No. 10-2019-0177946, mailed Apr. 19, 2022, 6 pgs.

Notice of Allowance for Korean Patent Application No. 10-2019-0179927, mailed Apr. 21, 2022, 5 pgs.

Garrido et al., "Automatic Face Reenactment", Proceedings of the IEEE Conference on Computer Vision and Pattern Recognition (CVPR), 2014, pp. 4217-4224.

Wang et al., "Translating Mathematical Formula Images to LaTex Sequences Using Deep Neural Networks with Sequence-level Training", arXiv:1908.11415, Aug. 29, 2019, 11 pgs.

* cited by examiner

FIG. 13
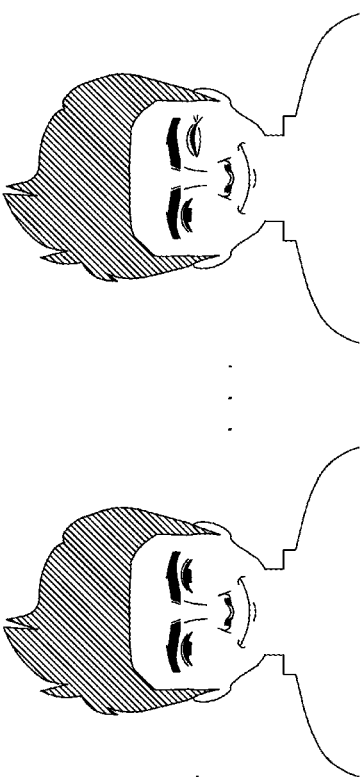
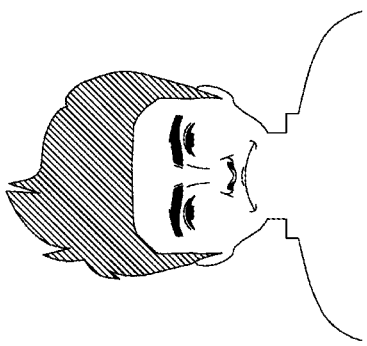
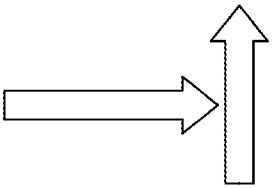

METHOD AND APPARATUS FOR GENERATING LANDMARK

CROSS-REFERENCE TO RELATED APPLICATION

This application is a continuation-in-part of U.S. patent application Ser. No. 17/092,486, filed on Nov. 9, 2020, which claims the benefit of Korean Patent Applications No. 10-2019-0141723, filed on Nov. 7, 2019, No. 10-2019-0177946, filed on Dec. 30, 2019, No. 10-2019-0179927, filed on Dec. 31, 2019, and No. 10-2020-0022795, filed on Feb. 25, 2020, in the Korean Intellectual Property Office, the disclosures of which are incorporated herein in their entireties by reference.

BACKGROUND

1. Field

The present disclosure relates to a method and an apparatus for generating a landmark. More particularly, the present disclosure relates to a method, an apparatus, and a computer-readable recording medium capable of deriving attributes relevant to subject identification and subject expression identification.

2. Description of the Related Art

Extraction of a facial landmark means the extraction of keypoints of a main part of a face or the extraction of an outline drawn by connecting the keypoints. Facial landmarks have been used in techniques including analysis, synthesis, morphing, reenactment, and classification of facial images, e.g., facial expression classification, pose analysis, synthesis, and transformation.

Existing facial image analysis and utilization techniques based on facial landmarks do not distinguish appearance characteristics from emotional characteristics, e.g., facial expressions, of a subject when processing facial landmarks, leading to deterioration in performance. For example, when performing emotion classification on a facial image of a person whose eyebrows are at a height greater than the average, the facial image may be misclassified as surprise even when it is actually emotionless.

SUMMARY

The present disclosure provides a method and an apparatus for generating a landmark. The present disclosure also provides a computer-readable recording medium having recorded thereon a program for executing the method in a computer. The technical objects of the present disclosure are not limited to the technical objects described above, and other technical objects may be inferred from the following embodiments.

Additional aspects will be set forth in part in the description which follows and, in part, will be apparent from the description, or may be learned by practice of the presented embodiments of the disclosure.

A method of transforming a landmark according to an aspect includes: receiving an input image including a facial image of a first person and a landmark corresponding to the facial image; estimating a transformation matrix corresponding to the landmark; and calculating an expression landmark and an identity landmark corresponding to the input image by using the transformation matrix.

A computer-readable recording medium according to another aspect includes a recording medium having recorded thereon a program for performing the method.

At least one processor according to another aspect is configured to: receive an input image including a facial image of a first person and a landmark corresponding to the facial image; estimate a transformation matrix corresponding to the landmark; and calculate an expression landmark and an identity landmark corresponding to the input image by using the transformation matrix.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a diagram illustrating an example in which a reenacted image is generated, according to an embodiment;

DETAILED DESCRIPTION

Figure 1:
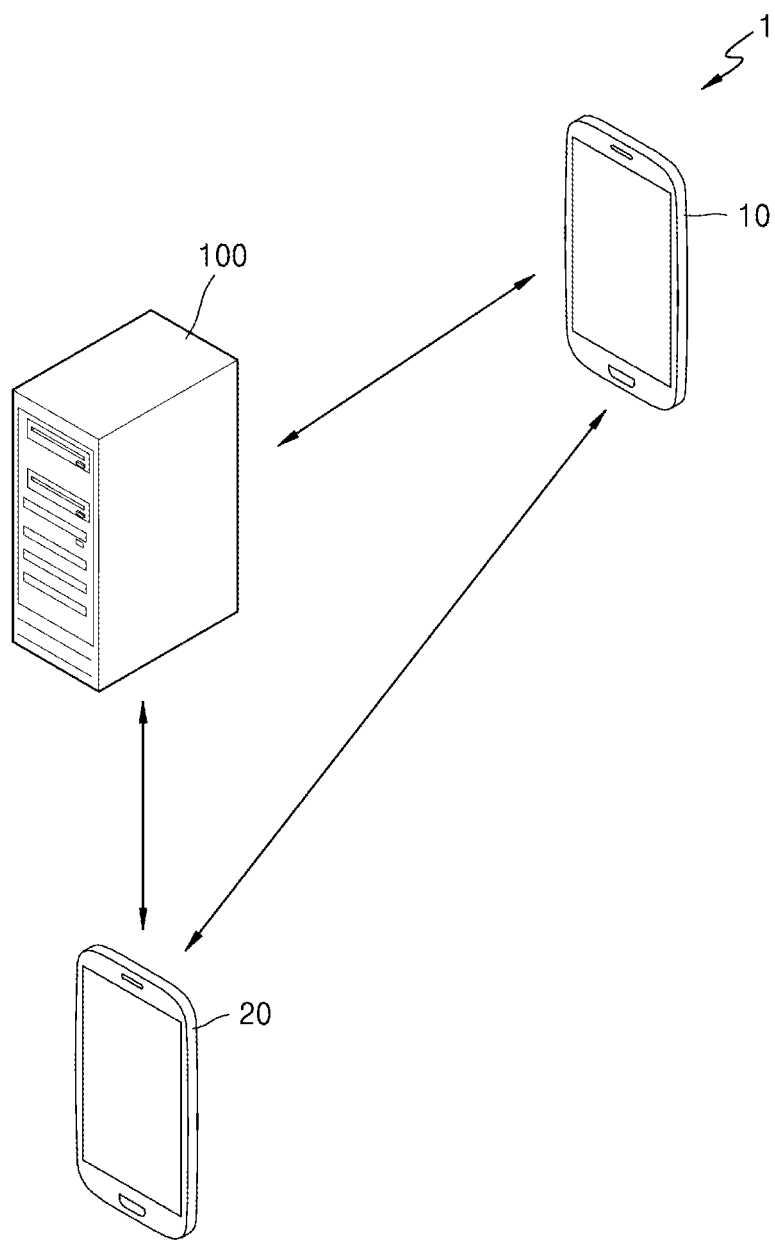
FIG. 1 is a diagram illustrating an example of a system in which a method of generating a reenacted image is performed, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although the terms used in the embodiments are selected from among common terms that are currently widely used, the terms may be different according to an intention of one of ordinary skill in the art, a precedent, or the advent of new technology. Also, in particular cases, the terms are discretionally selected by the applicant of the present disclosure, in which case, the meaning of those terms will be described in detail in the corresponding part of the detailed description. Therefore, the terms used in the specification are not merely designations of the terms, but the terms are defined based on the meaning of the terms and content throughout the specification.

Throughout the specification, when a part "includes" a component, it means that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

In addition, although the terms such as "first" or "second" may be used herein to describe various elements, these elements should not be limited by these terms. These terms are only used to distinguish one element from another element.

Hereinafter, embodiments will be described in detail with reference to the accompanying drawings. The embodiments may, however, be embodied in many different forms and should not be construed as being limited to the embodiments set forth herein.

The present disclosure is based on the paper entitled 'MarioNETte: Few-shot Face Reenactment Preserving Identity of Unseen Targets' (arXiv: 1911.08139v1, [cs.CV], 19 Nov. 2019). Therefore, the descriptions in the paper including those omitted herein may be employed in the following description.

Hereinafter, embodiments will be described in detail with reference to the drawings.

FIG. 1 is a diagram illustrating an example of a system 1 in which a method of generating a reenacted image is performed, according to an embodiment.

Referring to FIG. 1, the system 1 includes a first terminal 10, a second terminal 20, and a server 100. Although only two terminals (i.e., the first terminal 10 and the second terminal 20) are illustrated in FIG. 1 for convenience of description, the number of terminals is not limited to that illustrated in FIG. 1.

The server 100 may be connected to an external device through a communication network. The server 100 may transmit data to or receive data from an external device (e.g., the first terminal 10 or the second terminal 20) connected thereto.

For example, the communication network may include a wired communication network, a wireless communication network, and/or a complex communication network. In addition, the communication network may include a mobile communication network such as Third Generation (3G), Long-Term Evolution (LTE), or LTE Advanced (LTE-A). Also, the communication network may include a wired or wireless communication network such as Wi-Fi, universal mobile telecommunications system (UMTS)/general packet radio service (GPRS), and/or Ethernet.

The communication network may include a short-range communication network such as magnetic secure transmission (MST), radio frequency identification (RFID), near-field communication (NFC), ZigBee, Z-Wave, Bluetooth, Bluetooth Low Energy (BLE), or infrared (IR) communication. In addition, the communication network may include a local area network (LAN), a metropolitan area network (MAN), or a wide area network (WAN).

The server 100 may receive data from at least one of the first terminal 10 and the second terminal 20. The server 100 may perform an operation by using data received from at least one of the first terminal 10 and the second terminal 20. The server 100 may transmit a result of the operation to at least one of the first terminal 10 and the second terminal 20.

The server 100 may receive a relay request from at least one of the first terminal 10 and the second terminal 20. The server 100 may select the terminal that has transmitted the relay request. For example, the server 100 may select the first terminal 10 and the second terminal 20.

The server 100 may relay a communication connection between the selected first terminal 10 and second terminal 20. For example, the server 100 may relay a video call connection between the first terminal 10 and the second terminal 20 or may relay a text transmission/reception connection. The server 100 may transmit, to the second terminal 20, connection information about the first terminal 10, and may transmit, to the first terminal 10, connection information about the second terminal 20.

The connection information about the first terminal 10 may include, for example, an IP address and a port number of the first terminal 10. The first terminal 10 having received the connection information about the second terminal 20 may attempt to connect to the second terminal 20 by using the received connection information.

When an attempt by the first terminal 10 to connect to the second terminal 20 or an attempt by the second terminal 20 to connect to the first terminal 10 is successful, a video call session between the first terminal 10 and the second terminal 20 may be established. The first terminal 10 may transmit an image or sound to the second terminal 20 through the video call session. The first terminal 10 may encode the image or sound into a digital signal and transmit a result of the encoding to the second terminal 20.

Also, the first terminal 10 may receive an image or sound from the second terminal 20 through the video call session. The first terminal 10 may receive an image or sound encoded into a digital signal and decode the received image or sound.

The second terminal 20 may transmit an image or sound to the first terminal 10 through the video call session. Also, the second terminal 20 may receive an image or sound from the first terminal 10 through the video call session. Accordingly, a user of the first terminal 10 and a user of the second terminal 20 may make a video call with each other.

The first terminal 10 and the second terminal 20 may be, for example, a desktop computer, a laptop computer, a smart phone, a smart tablet, a smart watch, a mobile terminal, a digital camera, a wearable device, or a portable electronic device. The first terminal 10 and the second terminal 20 may execute a program or an application. The first terminal 10 and the second terminal 20 may be of the same type or different types.

The server 100 may generate a reenacted image by using a driver image and a target image. For example, each of the images may be an image of the face of a person or an animal, but is not limited thereto. Hereinafter, a driver image, a target image, and a reenacted image according to an embodiment will be described in detail with reference to FIG. 2.

Figure 2:
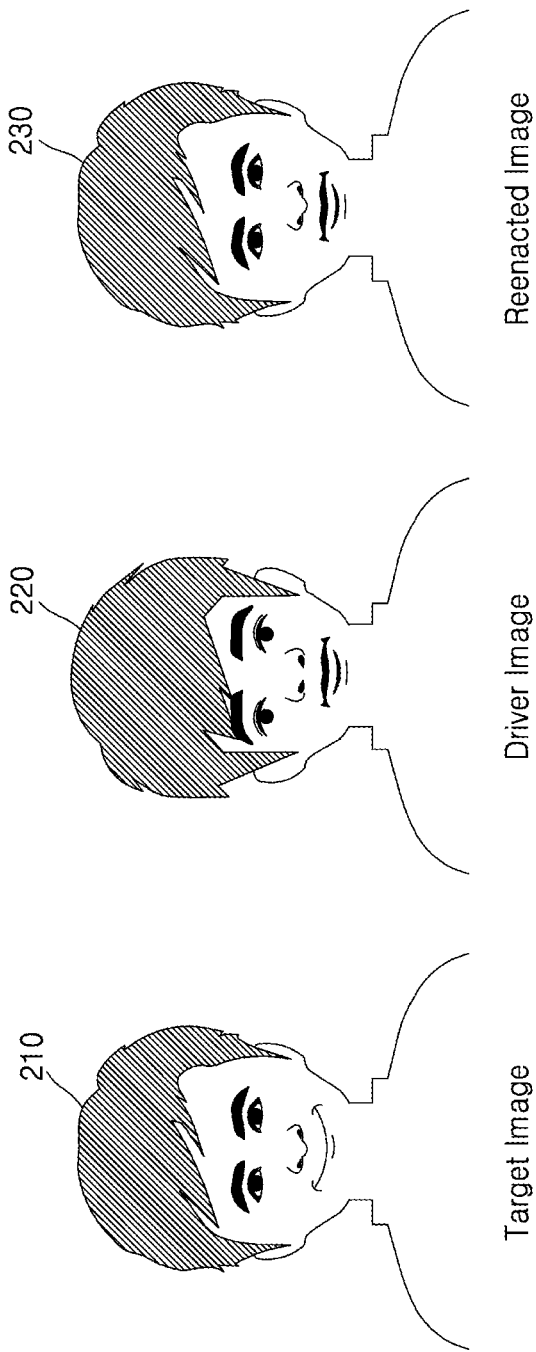
FIG. 2 is a diagram illustrating examples of a driver image, a target image, and a reenacted image, according to an embodiment.

FIG. 2 is a diagram illustrating examples of a driver image, a target image, and a reenacted image, according to an embodiment.

FIG. 2 illustrates a target image 210, a driver image 220, and a reenacted image 230. For example, the driver image 220 may be an image representing the face of the user of the first terminal 10 or the second terminal 20, but is not limited thereto. In addition, the driver image 220 may be a static image including a single frame or a dynamic image including a plurality of frames.

For example, the target image 210 may be an image of the face of a person other than the users of the terminals 10 and 20, or an image of the face of one of the users of the terminal 10 and 20 but different from the driver image 220. In addition, the target image 210 may be a static image or a dynamic image.

The face in the reenacted image 230 has the identity of the face in the target image 210 (hereinafter, referred to as 'target face') and the pose and facial expression of the face in the driver image 220 (hereinafter, referred to as a 'driver face'). Here, the pose may include a movement, position, direction, rotation, inclination, etc. of the face. Meanwhile, the facial expression may include the position, angle, and/or direction of a facial contour. In this embodiment, a facial contour may include, but is not limited to, an eye, nose, and/or mouth.

In detail, when comparing the target image 210 with the reenacted image 230, the two images 210 and 230 show the same person with different facial expressions. That is, the eyes, nose, mouth, and hair style of the target image 210 are identical to those of the reenacted image 230, respectively.

The facial expression and pose shown in the reenacted image 230 are substantially the same as the facial expression and pose of the driver face. For example, when the mouth of the driver face is open, the reenacted image 230 is generated in which the mouth of a face is open; and when the head of the driver face is turned to the right or left, the reenacted image 230 is generated in which the head of a face is turned to the right or left.

When the driver image 220 is a dynamic image in which the driver face continuously changes, the reenacted image 230 may be generated in which the target image 210 is transformed according to the pose and facial expression of the driver face.

Meanwhile, the quality of the reenacted image 230 generated by using an existing technique in the related art may be seriously degraded. In particular, in the case of a small number of target images 210 (i.e., in a few-shot setting), and the identity of the target face does not coincide with the identity of the driver face, the quality of the reenacted image 230 may be significantly low.

By using a method of generating a reenacted image according to an embodiment, the reenacted image 230 may be generated with high quality even in a few-shot setting. Hereinafter, the method of generating a reenacted image will be described in detail with reference to FIGS. 3 to 17.

Figure 3:
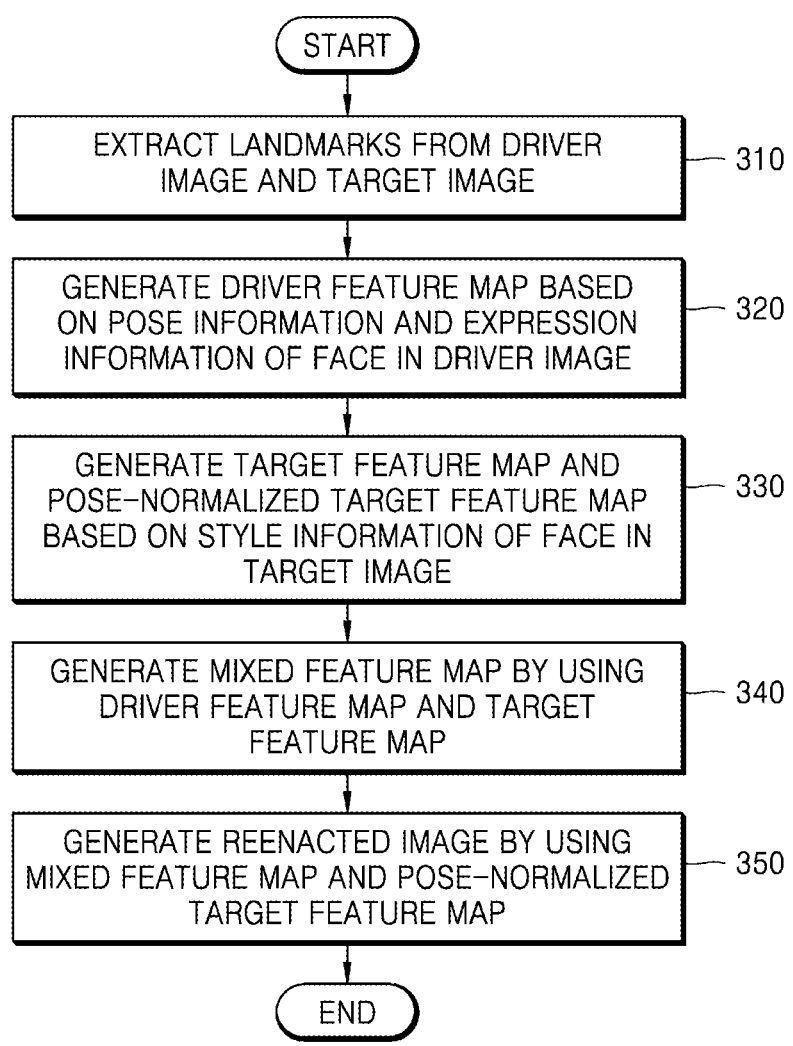
FIG. 3 is a flowchart of an example of a method of generating a reenacted image, according to an embodiment.

FIG. 3 is a flowchart of an example of a method of generating a reenacted image, according to an embodiment.

Figure 4:
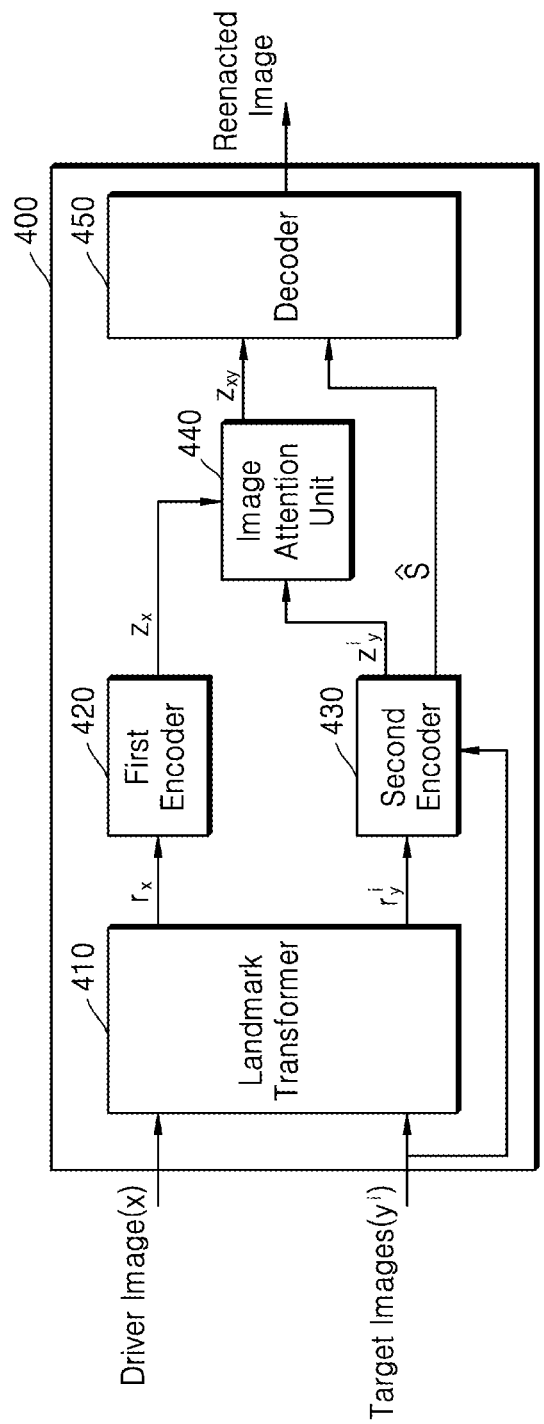
FIG. 4 is a configuration diagram illustrating an example of an apparatus for generating a reenacted image, according to an embodiment.

Operations of the flowchart shown in FIG. 3 are performed by an apparatus 400 for generating a reenacted image shown in FIG. 4. Accordingly, hereinafter, it will be described that the apparatus 400 of FIG. 4 performs the operations of FIG. 3.

In operation 310, the apparatus 400 extracts a landmark from each of a driver image and a target image. In other words, the apparatus 400 extracts at least one landmark from the driver image and extracts at least one landmark from the target image.

For example, the target image may include at least one frame. For example, when the target image includes a plurality of frames, the target image may be a dynamic image (e.g., a video image) in which the target face moves according to a continuous flow of time.

The landmark may include information about a position corresponding to at least one of the eyes, nose, mouth, eyebrows, and ears of each of the driver face and the target face. For example, the apparatus 400 may extract a plurality of three-dimensional landmarks from each of the driver image and the target image. As a result, the apparatus 400 may generate a two-dimensional landmark image by using extracted three-dimensional landmarks.

For example, the apparatus 400 may extract an expression landmark and an identity landmark from each of the driver image and the target image.

For example, the expression landmark may include expression information and pose information of the driver face and/or the target face. Here, the expression information may include information about the position, angle, and direction of an eye, a nose, a mouth, a facial contour, etc. In addition, the pose information may include information such as the movement, position, direction, rotation, and inclination of the face.

For example, the identity landmark may include style information of the driver face and/or the target face. Here, the style information may include texture information, color information, shape information, etc. of the face.

In operation 320, the apparatus 400 generates a driver feature map based on pose information and expression information of a first face in the driver image.

The first face refers to the driver face. As described above with reference to FIG. 2, the first face may be the face of the user of one of the terminals 10 and 20. Here, the pose information may include information such as the movement, position, direction, rotation, and inclination of the face. In addition, the expression information may include information about the position, angle, direction, etc. of an eye, a nose, a mouth, a facial contour, etc.

For example, the apparatus 400 may generate the driver feature map by inputting the pose information and the expression information of the first face into an artificial neural network. Here, the artificial neural network may include a plurality of artificial neural networks that are separated from each other, or may be implemented as a single artificial neural network.

According to an embodiment, the expression information or the pose information may correspond to the expression landmark obtained in operation 310.

In operation 330, the apparatus 400 generates a target feature map and a pose-normalized target feature map based on style information of a second face in the target image.

The second face refers to the target face. As described above with reference to FIG. 2, the second face may be the face of a person other than the users of the terminals 10 and 20. Alternatively, the second face may be of the user of one of the terminals 10 and 20, but in a different state from that of the driver face.

The style information may include texture information, color information, and/or shape information. Accordingly, the style information of the second face may include texture information, color information, and/or shape information, corresponding to the second face.

According to an embodiment, the style information may correspond to the identity landmark obtained in operation 310.

The target feature map may include the style information and pose information of the second face. In addition, the pose-normalized target feature map corresponds to an output by an artificial neural network with respect to style information of the second face input thereinto. Alternatively, the pose-normalized target feature map may include information corresponding to a unique feature of the second face other than the pose information of the second face. That is, it may be understood that the target feature map includes data corresponding to the expression landmark obtained from the second face, and the pose-normalized target feature map includes data corresponding to the identity landmark obtained from the second face.

In operation 340, the apparatus 400 generates a mixed feature map by using the driver feature map and the target feature map.

For example, the apparatus 400 may generate the mixed feature map by inputting the pose information and the expression information of the first face and the style information of the second face into an artificial neural network. Accordingly, the mixed feature map may be generated such that the second face has the pose and facial expression corresponding to the landmark of the first face. In addition, spatial information of the second face included in the target feature map may be reflected in the mixed feature map.

In operation 350, the apparatus 400 generates a reenacted image by using the mixed feature map and the pose-normalized target feature map.

Accordingly, the reenacted image may be generated to have the identity of the second face and the pose and facial expression of the first face.

Hereinafter, an example of an operation of the apparatus 400 will be described in detail with reference to FIGS. 4 to 17.

FIG. 4 is a configuration diagram illustrating an example of the apparatus 400 for generating a reenacted image, according to an embodiment.

Referring to FIG. 4, the apparatus 400 for generating a reenacted image includes a landmark transformer 410, a first encoder 420, a second encoder 430, an image attention unit 440, and a decoder 450. FIG. 4 illustrates the apparatus 400 including only components related to the present embodiment. Thus, it will be understood by one of skill in the art that other general-purpose components than those illustrated in FIG. 4 may be further included in the apparatus 400.

In addition, it will be understood by one of skill in the art that one or more of the landmark transformer 410, the first encoder 420, the second encoder 430, the image attention unit 440, and the decoder 450 of the apparatus 400 may be implemented as an independent apparatus.

In addition, the landmark transformer 410, the first encoder 420, the second encoder 430, the image attention unit 440, and the decoder 450 may be implemented as at least one processor. Here, the processor may be implemented as an array of a plurality of logic gates, or may be implemented as a combination of a general-purpose microprocessor and a memory storing a program executable by the microprocessor. In addition, it will be understood by one of skill in the art that the landmark transformer 410, the first encoder 420, the second encoder 430, the image attention unit 440, and the decoder 450 may be implemented as different types of hardware.

For example, the apparatus 400 of FIG. 4 may be included in the server 100 of FIG. 1. For example, the server 100 may receive a driver image from the first terminal 10 or the second terminal 20, and generate a reenacted image by using a target image stored in the server 100. Alternatively, the server 100 may receive a driver image and a target image from the first terminal 10 or the second terminal 20, and generate a reenacted image by using the received driver image and target image.

As another example, the apparatus 400 of FIG. 4 may be included in the first terminal 10 or the second terminal 20 of FIG. 1. In this case, the terminal may generate a reenacted image by using a driver image and a target image received from the server 100 or stored in the terminal.

Meanwhile, the apparatus 400 shown in FIG. 4 performs the operations in the flowchart illustrated in FIG. 3. Therefore, it will be understood by one of skill in the art that the operations described above with reference to FIG. 3, including those omitted below, may be performed by the apparatus 400.

The apparatus 400 receives a driver image x and target images $y^i$, and transmits the received driver image x and target images $y^i$ to the landmark transformer 410. Also, the apparatus 400 transfers the target images $y^i$ to the second encoder 430, which will be described below. Here, i is a natural number greater than or equal to 2.

The landmark transformer 410 extracts a landmark from each of the driver image x and the target images $y^i$.

For example, the landmark transformer 410 may generate a landmark image based on the driver image x and the target images $y^i$. In detail, the landmark transformer 410 may extract three-dimensional landmarks from each of the driver image x and the target images $y^i$, and render the extracted three-dimensional landmarks to two-dimensional landmark images $r_x$ and $r^i_y$. That is, the landmark transformer 410 generates the two-dimensional landmark image $r_x$ for the driver image x by using the three-dimensional landmarks of the driver image x, and generates the two-dimensional landmark images $r^i_y$ for the target images $y^i$ by using the three-dimensional landmarks of the target images $y^i$. An example in which the landmark transformer 410 extracts the three-dimensional landmarks of the driver image x and the target images $y^i$ will be described below with reference to FIGS. 5 to 7.

As described above with reference to FIG. 3, the landmark transformer 410 may extract expression landmarks and identity landmarks from the driver image x and the target images $y^i$. For example, the expression landmark may include expression information and pose information of the driver face and/or the target face. In addition, the identity landmark may include style information of the driver face and/or the target face.

The first encoder 420 generates a driver feature map $z_x$ based on pose information and expression information of a first face in the driver image x.

In detail, the first encoder 420 generates the driver feature map $z_x$ based on at least one of the pose information and the expression information of the driver face. For example, the first encoder 420 may extract the pose information and the expression information of the driver face from the two-dimensional landmark image $r_x$, and generate the driver feature map $z_x$ by using the extracted information.

Here, it may be understood that the pose information and the expression information correspond to the expression landmark extracted by the landmark transformer 410.

The second encoder 430 may generate target feature maps $z^i_y$ and a normalized target feature map $\hat{S}$ based on style information of a second face in the target images $y^i$.

In detail, the second encoder 430 generates the target feature maps $z^i_y$ based on the style information of the target face. For example, the second encoder 430 may generate the target feature maps $z^i_y$ by using the target images $y^i$ and the two-dimensional landmark images $r^i_y$. In addition, the second encoder 430 transforms the target feature maps $z^i_y$ into the normalized target feature maps $\hat{S}$ through a warping function T. Here, the normalized target feature map $\hat{S}$ denotes a pose-normalized target feature map. An example in which the second encoder 430 generates the target feature maps $z^i_y$ and the normalized target feature maps $\hat{S}$ will be described below with reference to FIG. 8.

Meanwhile, it may be understood that the style information corresponds to the identity landmark extracted by the landmark transformer 410.

The image attention unit 440 generates a mixed feature map $z_{xy}$ by using the driver feature map $z_x$ and the target feature maps $z^i_y$. An example in which the image attention unit 440 generates the mixed feature map $z_{xy}$ will be described below with reference to FIG. 9.

The decoder 450 generates a reenacted image by using the mixed feature map $z_{xy}$ and the normalized target feature maps $\hat{S}$. An example in which the decoder 450 generates the reenacted image will be described below with reference to FIG. 10.

Although not illustrated in FIG. 4, the apparatus 400 may further include a discriminator. Here, the discriminator may determine whether input images (i.e., the driver image x and the target images $y^i$) are real images.

Figure 5:
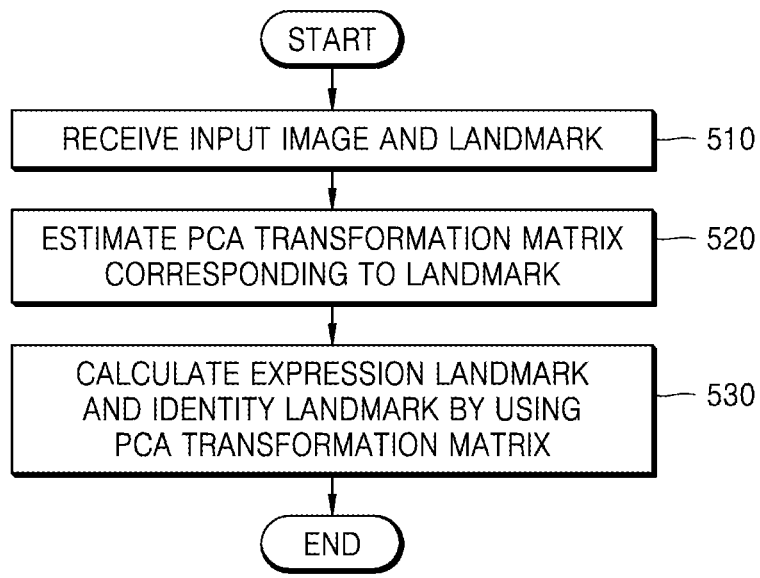
FIG. 5 is a flowchart of an example of operations performed by a landmark transformer in a few-shot setting, according to an embodiment.

FIG. 5 is a flowchart of an example of operations performed by a landmark transformer in a few-shot setting, according to an embodiment.

FIG. 5 illustrates an example in which the landmark transformer 410 operates with a small number of target images $y^i$ (i.e., in a few-shot setting). Large structural differences between landmarks of a driver face and a target face may lead to severe degradation in the quality of a reenacted image. The usual approach to such a case has been to learn a transformation for every identity and/or to prepare paired landmark data with the same expressions. However, in a few-shot setting, these methods output unnatural results, and have a difficulty in obtaining labeled data.

The landmark transformer 410 according to an embodiment utilizes multiple dynamic images of unlabeled faces and is trained in an unsupervised manner. Accordingly, in a few-shot setting, a high-quality reenacted image may be generated even with a large structural difference between landmarks of a driver face and a target face.

In operation 510, the landmark transformer 410 receives an input image and a landmark.

The input image refers to a driver image and/or target images, and the target images may include facial images of an arbitrary person.

In addition, the landmark refers to keypoints of one or more main parts of a face. For example, the landmark included in the face may include information about the position of at least one of the main parts of the face (e.g., eyes, nose, mouth, eyebrows, jawline, and ears). The landmark may include information about the size or shape of at least one of the main parts of the face. The landmark may include information about the color or texture of at least one of the main parts of the face.

The landmark transformer 410 may extract a landmark corresponding to the face in the input image. The landmark may be extracted through a known technique, and the landmark transformer 410 may use any known method. In addition, the present disclosure is not limited to a method performed by the landmark transformer 410 to obtain a landmark.

A landmark may be updated as a sum of an average landmark, an identity landmark, and an expression landmark. For example, when a video image (i.e., a dynamic image) of person c is received as an input image, a landmark of person c in a frame t may be expressed as a sum of an average landmark related to an average identity of collected human faces (i.e., average facial landmark geometry), an identity landmark related to a unique identity of person c (i.e., facial landmark of identity geometry), and an expression landmark of person c in the frame t (i.e., facial landmark of expression geometry). An example of calculating the average facial landmark geometry, the facial landmark of identity geometry, and the facial landmark of expression geometry will be described below in detail with reference to operation 530 in FIG. 5.

In operation 520, the landmark transformer 410 estimates a principal component analysis (PCA) transformation matrix corresponding to the updated landmark.

The PCA transformation matrix may constitute the landmark together with a predetermined unit vector. For example, a first landmark may be calculated as a product of the unit vector and a first PCA transformation matrix, and a second landmark may be calculated as a product of the unit vector and a second PCA transformation matrix.

The PCA transformation matrix is a matrix that transforms a high-dimensional (e.g., three-dimensional) landmark into low-dimensional (e.g., two-dimensional) data, and may be used in PCA.

PCA is a dimensionality reduction method in which the distribution of data may be preserved as much as possible and new axes orthogonal to each other are searched for to transform variables in a high-dimensional space into variables in a low-dimensional space. In detail, in PCA, first, a hyperplane closest to data may be searched for, and then the data may be projected onto a low-dimensional hyperplane to reduce the dimensionality of the data.

In PCA, a unit vector defining an i-th axis may be referred to as an i-th principal component (PC), and, by linearly combining such axes, high-dimensional data may be transformed into low-dimensional data.

For example, the landmark transformer 410 may estimate the transformation matrix by using Equation 1.

$$X = \alpha Y \quad \text{[Equation 1]}$$

In Equation 1, X denotes a high-dimensional landmark, Y denotes a low-dimensional PC, and $\alpha$ denotes a PCA transformation matrix.

As described above, the PC (i.e., the unit vector) may be predetermined. Accordingly, when a new landmark is received, a corresponding PCA transformation matrix may be determined. In this case, a plurality of PCA transformation matrices may exist corresponding to one landmark.

In operation 520, the landmark transformer 410 may use a pre-trained learning model to estimate a PCA transformation matrix. Here, the learning model refers to a model that is pre-trained to estimate a PCA transformation matrix from an arbitrary facial image and a landmark corresponding thereto.

The learning model may be trained to estimate a PCA transformation matrix from a facial image and a landmark corresponding to the facial image. In this case, several PCA transformation matrices may exist corresponding to one high-dimensional landmark, and the learning model may be trained to output only one PCA transformation matrix among the PCA transformation matrices. Accordingly, the landmark transformer 410 may output one PCA transformation matrix by using an input image and a corresponding landmark.

A landmark to be used as an input to the learning model may be extracted from a facial image and obtained through a known method of visualizing the facial image.

The learning model may be trained to classify a landmark into a plurality of semantic groups corresponding to the main parts of a face, respectively, and output PCA transformation coefficients corresponding to the plurality of semantic groups, respectively. Here, the semantic groups may be classified to correspond to eyebrows, eyes, nose, mouth, and/or jawline.

The landmark transformer 410 may classify a landmark into semantic groups in subdivided units by using the learning model, and estimate PCA transformation matrices corresponding to the classified semantic groups.

In operation 530, the landmark transformer 410 calculates an expression landmark and an identity landmark corresponding to the input image by using the PCA transformation matrix.

A landmark may be decomposed into a plurality of sub-landmarks. In detail, when a video image (i.e., a dynamic image) of person c is received as an input image, a landmark $\bar{l}(c, t)$ of person c in a frame t may be expressed as a sum of an average landmark $\bar{l}_m$, related to an average identity of collected human faces (i.e., average facial landmark geometry), an identity landmark $\bar{l}_{id}(c)$ related to a unique identity of person c (i.e., facial landmark of identity geometry), and an expression landmark $\bar{l}_{exp}(c, t)$ of person c in the frame t (i.e., facial landmark of expression geometry).

For example, the landmark $\bar{l}(c, t)$ of person c in the frame t may be decomposed into a plurality of sub-landmarks as shown in Equation 2.

$$\bar{l}(c,t) = \bar{l}_m + \bar{l}_{id}(c) + \bar{l}_{exp}(c,t) \quad \text{[Equation 2]}$$

In Equation (2), $\bar{l}(c, t)$ denotes a normalized landmark in a t-th frame of a dynamic image (e.g., a video image) containing the face of person c. In detail, the landmark transformer 410 may transform a three-dimensional landmark l(c, t) into the normalized landmark $\bar{l}(c, t)$ by normalizing the scale, translation, and rotation.

In addition, in Equation 2, $\bar{l}_m$ may be calculated by using previously collected images, and may be defined by Equation 3.

$$\bar{l}_m = \frac{1}{T} \sum_c \sum_t \bar{l}(c, t) \quad \text{[Equation 3]}$$

In Equation 3, T denotes the total number of frames included in the dynamic image. Accordingly, $\bar{l}_m$ denotes an average of the landmarks $\bar{l}(c, t)$ of people in the previously collected dynamic images.

In addition, in Equation 2, $\bar{l}_{id}(c)$ may be calculated by Equation 4.

$$\bar{l}_{id}(c) = \Sigma_t \bar{l}(c,t)/T_c - \bar{l}_m, \text{ (where, } T_c \text{ is the number of frames of c-th video)} \quad \text{[Equation 4]}$$

In addition, in Equation 2, $\bar{l}_{exp}(c, t)$ may be calculated by Equation 5.

$$\bar{l}_{exp}(c, t) = \sum_{k=1}^{n_{exp}} \alpha_k(c, t) b_{exp,k} = b_{exp}^T \alpha(c, t) \quad \text{[Equation 5]}$$

Equation 5 represents a result of performing PCA on each of the semantic groups (e.g., the right eye, left eye, nose, and mouth) of person c. In Equation 5, $n_{exp}$ denotes the sum of the numbers of expression bases of all semantic groups, $b_{exp}$ denotes an expression basis that is a PCA basis, and $\alpha$ denotes a PCA coefficient. $\alpha$ corresponds to a PCA coefficient of the PCA transformation matrix corresponding to each semantic group estimated in operation 520.

In other words, $b_{exp}$ denotes a unit vector, and a high-dimensional expression landmark may be defined as a combination of low-dimensional unit vectors. In addition, $n_{exp}$ denotes the total number of facial expressions that person c may make with his/her right eye, left eye, nose, mouth, etc.

The landmark transformer 410 separates expression landmarks into semantic groups of the face (e.g., mouth, nose, and eyes) and performs PCA on each group to extract the expression bases from the training data.

Accordingly, the expression landmark $\bar{l}_{exp}(c, t)$ of person c may be defined as a set of pieces of expression information for each of the main parts of the face (i.e., the right eye, left eye, nose, etc.). In addition, $\alpha_k(c, t)$ may exist corresponding to each unit vector.

The landmark transformer 410 may train a learning model to estimate the PCA coefficient $\alpha(c, t)$ by using an image x(c, t) and the landmark $\bar{l}(c, t)$ of person c. Through such a training process, the learning model may have an ability to estimate a PCA coefficient from an image of a specific person and a landmark corresponding thereto, and to estimate a low-dimensional unit vector.

As described above with reference to Equation 2, a landmark may be defined as a sum of an average landmark, an identity landmark, and an expression landmark. The landmark transformer 410 may calculate an expression landmark through operation 530. Therefore, the landmark transformer 410 may calculate an identity landmark as shown in Equation 6.

$$\hat{l}_{id}(c) = \bar{l}(c,t) - \bar{l}_m - \hat{l}_{exp}(c,t) \quad \text{[Equation 6]}$$

In Equation 6, $\hat{l}_{exp}(c, t)$ may be calculated through Equation 7, which may be derived from Equation 5.

$$\hat{l}_{exp}(c,t) = \lambda_{exp} b_{exp}^T \alpha(c,t) \quad \text{[Equation 7]}$$

In Equation 7, $\lambda_{exp}$ denotes a hyperparameter that controls the intensity of an expression predicted by the landmark transformer 410.

When the target images $y^i$ are received as input images, the landmark transformer 410 takes the mean over all identity landmarks $\hat{l}_{id}(c_y)$. In summary, when the driver image x and the target images $y^i$ are received as input images, and a target landmark $\bar{l}(c_y, t_y)$ and a driver landmark $\bar{l}(c_x, t_x)$ are received, the landmark transformer 410 transforms the received landmark as shown in Equation 8.

$$\hat{l}(c_x \rightarrow c_y, t) = \bar{l}_m + \hat{l}_{id}(c_y) + \hat{l}_{exp}(c_x, t_x) \quad \text{[Equation 8]}$$

The landmark transformer 410 performs denormalization to recover to the original scale, translation, and rotation, and then performs rasterization. A landmark generated through rasterization may be transferred to the first encoder 420 and the second encoder 430.

Figure 6:
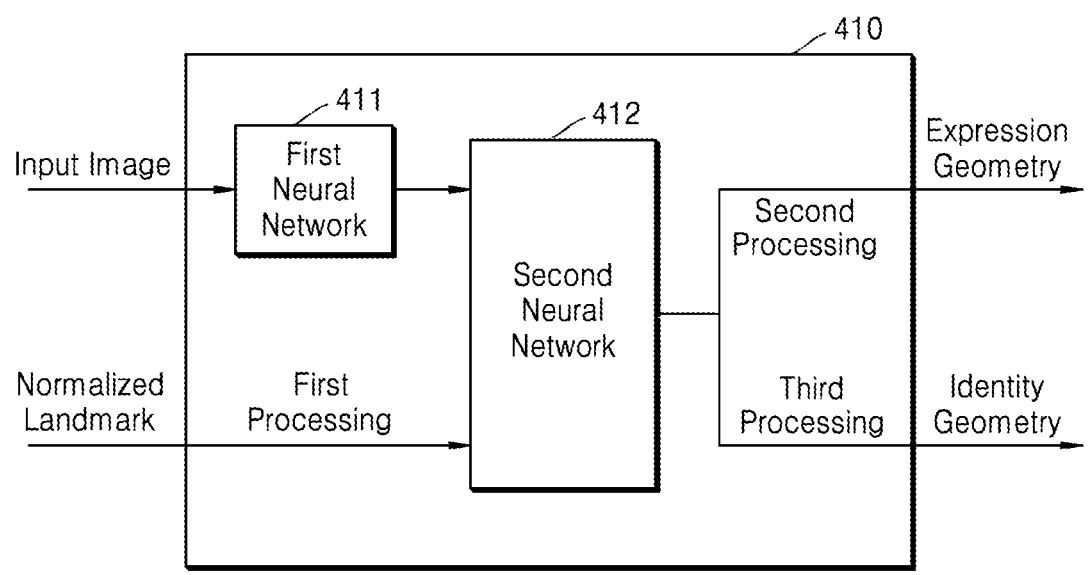
FIG. 6 is a configuration diagram illustrating an example of a landmark transformer in a few-shot setting, according to an embodiment.

FIG. 6 is a configuration diagram illustrating an example of the landmark transformer 410 in a few-shot setting, according to an embodiment.

Referring to FIG. 6, the landmark transformer 410 may include a first neural network 411 and a second neural network 412. Here, the first neural network 411 and the second neural network 412 may be implemented as known artificial neural networks. For example, the first neural network 411 may be implemented as a residual neural network (ResNet), which is a type of a convolutional neural network (CNN), but is not limited thereto. The second neural network 412 may be implemented as a multi-layer perceptron (MLP). Here, MLP is a type of artificial neural network in which multiple layers of perceptrons are stacked to overcome the limitation of a single-layer perceptron.

Although FIG. 6 illustrates that the first neural network 411 and the second neural network 412 are separate from each other, the present disclosure is not limited thereto. In other words, the first neural network 411 and the second neural network 412 may be implemented as a single artificial neural network.

Also, the learning models described with reference to FIG. 5 refer to the first neural network 411 and the second neural network 412.

The landmark transformer 410 illustrated in FIG. 6 performs operations included in the flowchart illustrated in FIG. 5. Therefore, the descriptions provided with reference to FIG. 5, including those omitted below, may also be applied to the operation of the landmark transformer 410 of FIG. 6.

When an input image x(c, t) and a normalized landmark Ĩ(c, t) are input, the landmark transformer 410 estimates a PCA coefficient α(c, t). Here, the input image x(c, t) may be a driver image and/or a target image. In addition, the input image may be a dynamic image (e.g., a video image) including a plurality of frames, or may be a static image including a single frame.

In detail, the first neural network 411 extracts an image feature from the input image x(c, t). In addition, the landmark transformer 410 performs first processing for removing an average landmark $\bar{l}_m$ from the normalized landmark Ĩ(c, t). The second neural network 412 estimates a PCA coefficient $\hat{\alpha}$(c, t) by using the image feature extracted by the first neural network 411 and a result of the first processing, i.e., Ĩ(c, t)−$\bar{l}_m$.

In addition, the landmark transformer 410 performs second processing for calculating an expression landmark $\hat{l}_{exp}$(c, t) according to the PCA coefficient and Equation 7. Furthermore, the landmark transformer 410 performs third processing for calculating an identity landmark $\hat{l}_{id}$(c) by using the result of the first processing (Ĩ(c, t)−$\bar{l}_m$) and a result of the second processing, i.e., $\hat{l}_{exp}$(c, t).

As described above with reference to FIGS. 5 and 6, the landmark transformer 410 may extract landmarks even in few-shot settings (i.e., when only a very small number of images or only a single image is available). As described above, when landmarks are extracted (i.e., an expression landmark and an identity landmark are separated), the quality of landmark-based facial image processing such as face reenactment, face classification, and/or face morphing may be improved. In other words, the landmark transformer 410 according to an embodiment may effectively extract (separate) a landmark from an image, even when a significantly small number of target images are given.

Meanwhile, the landmark transformer 410 may separate a landmark from an image even when a large number of target images 210 are given (i.e., in a many-shot setting). Hereinafter, an example in which the landmark transformer 410 extracts (separates) a landmark from an image in a many-shot setting will be described with reference to FIG. 7.

Figure 7:
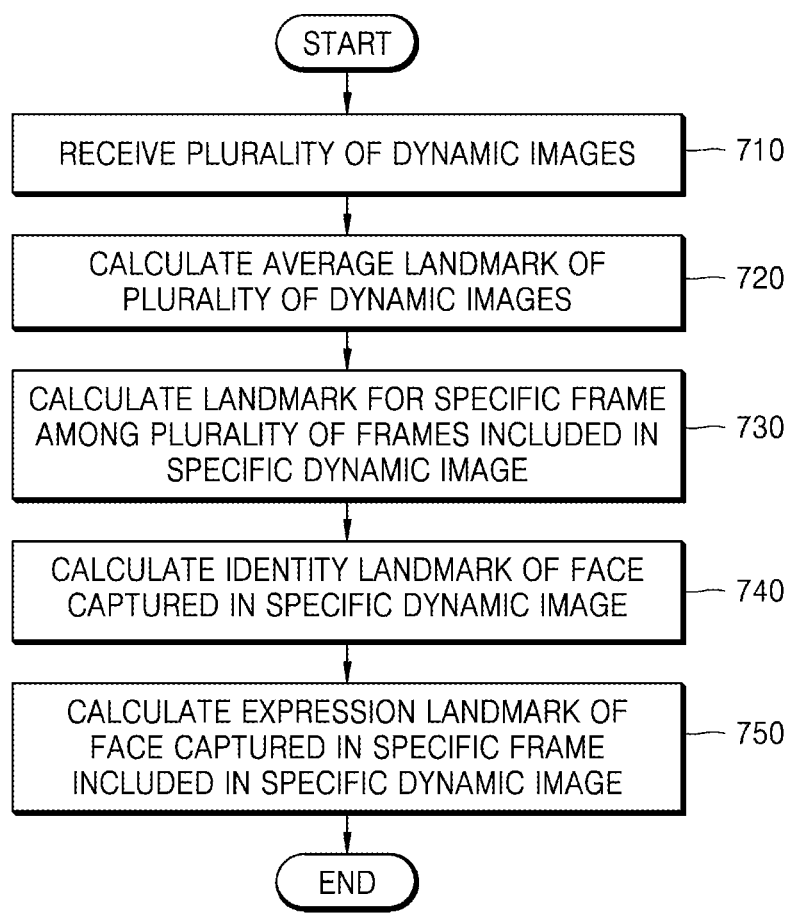
FIG. 7 is a flowchart of an example of operations performed by a landmark transformer in a many-shot setting, according to an embodiment.

FIG. 7 is a flowchart of an example of operations performed by a landmark transformer in a many-shot setting, according to an embodiment.

In operation 710, the landmark transformer 410 receives a plurality of dynamic images.

Here, the dynamic image includes a plurality of frames. Only one person may be captured in each of the dynamic images. That is, only the face of one person is captured in one dynamic image, and respective faces captured in the plurality of dynamic images may be of different people.

In operation 720, the landmark transformer 410 calculates an average landmark $l_m$ of the plurality of dynamic images.

For example, the average landmark $l_m$ may be calculated by Equation 9.

$$l_m = \frac{1}{CT} \sum_c \sum_t l(c, t) \quad \text{[Equation 9]}$$

In Equation 9, C denotes the number of input images, and T denotes the number of frames included in each of the input images.

The landmark transformer 410 may extract a landmark l(c, t) of each of the faces captured in the C dynamic images, respectively. Then, the landmark transformer 410 calculates an average value of all of the extracted landmarks l(c, t), and sets the calculated average value as the average landmark $l_m$.

In operation 730, the landmark transformer 410 calculates a landmark l(c, t) for a specific frame among a plurality of frames included in a specific dynamic image containing a specific face among the dynamic images.

For example, the landmark l(c, t) for the specific frame may be keypoint information of the face included in a t-th frame of a c-th dynamic image among the C dynamic images. That is, it may be assumed that the specific dynamic image is the c-th dynamic image and the specific frame is the t-th frame.

In operation 740, the landmark transformer 410 calculates an identity landmark $l_{id(c)}$ of the face captured in the specific dynamic image.

For example, the landmark transformer 410 may calculate the identity landmark $l_{id(c)}$ by using Equation 10.

$$l_{id(c)} = \frac{1}{T_c} \sum_{t \in T_c} l(c, t) - l_m \quad \text{[Equation 10]}$$

Various facial expressions of the specific face are captured in a plurality of frames included in the c-th dynamic image. Therefore, in order to calculate the identity landmark $l_{id(c)}$, the landmark transformer 410 may assume that a mean value $$\frac{1}{T_c} \Sigma_{t \in T_c} l_{exp(c,t)}$$

of facial expression landmarks $l_{exp}$ of the specific face included in the c-th dynamic image is 0. Accordingly, the identity landmark $l_{id(c)}$ may be calculated without considering the mean value $$\frac{1}{T_c}\Sigma_{t \in T_c} l_{exp(c,t)}$$

of the expression landmarks $l_{exp}$ of the specific face.

In summary, the identity landmark data $l_{id(c)}$ may be defined as a value obtained by subtracting the average landmark $l_m$ of the plurality of dynamic images from the mean value $$\frac{1}{T_c}\Sigma_{t \in T_c} l(c, t)$$

of the respective landmarks l(c, t) of the plurality of frames included in the c-th dynamic image.

In operation 750, the landmark transformer 410 may calculate an expression landmark $l_{exp(c,t)}$ of the face captured in the specific frame included in the specific dynamic image.

That is, the landmark transformer 410 may calculate the expression landmark $l_{exp(c,t)}$ of the face captured in the t-th frame of the c-th dynamic image. For example, the expression landmark $l_{exp(c,t)}$ may be calculated by Equation 11.

$$l_{exp(c,t)} = l(c, t) - l_m - l_{id(c)} = l(c, t) - \frac{1}{T_c}\sum_{t \in T_c} l(c, t) \quad \text{[Equation 11]}$$

The expression landmark $l_{exp(c,t)}$ may correspond to an expression of the face captured in the t-th frame and movement information of parts of the face, such as the eyes, eyebrows, nose, mouth, and chin line. In detail, the expression landmark $l_{exp(c,t)}$ may be defined as a value obtained by subtracting the average landmark $l_m$ and the identity landmark $l_{id(c)}$ from the landmark l(c, t) for the specific frame.

As described above with reference to FIG. 7, the landmark transformer 410 may extract (separate) a landmark of a face captured in a dynamic image in a many-shot setting. Accordingly, the landmark transformer 410 may obtain not only main keypoints of the face captured in the dynamic image, but also the facial expression and the movement information of the face.

Figure 8:
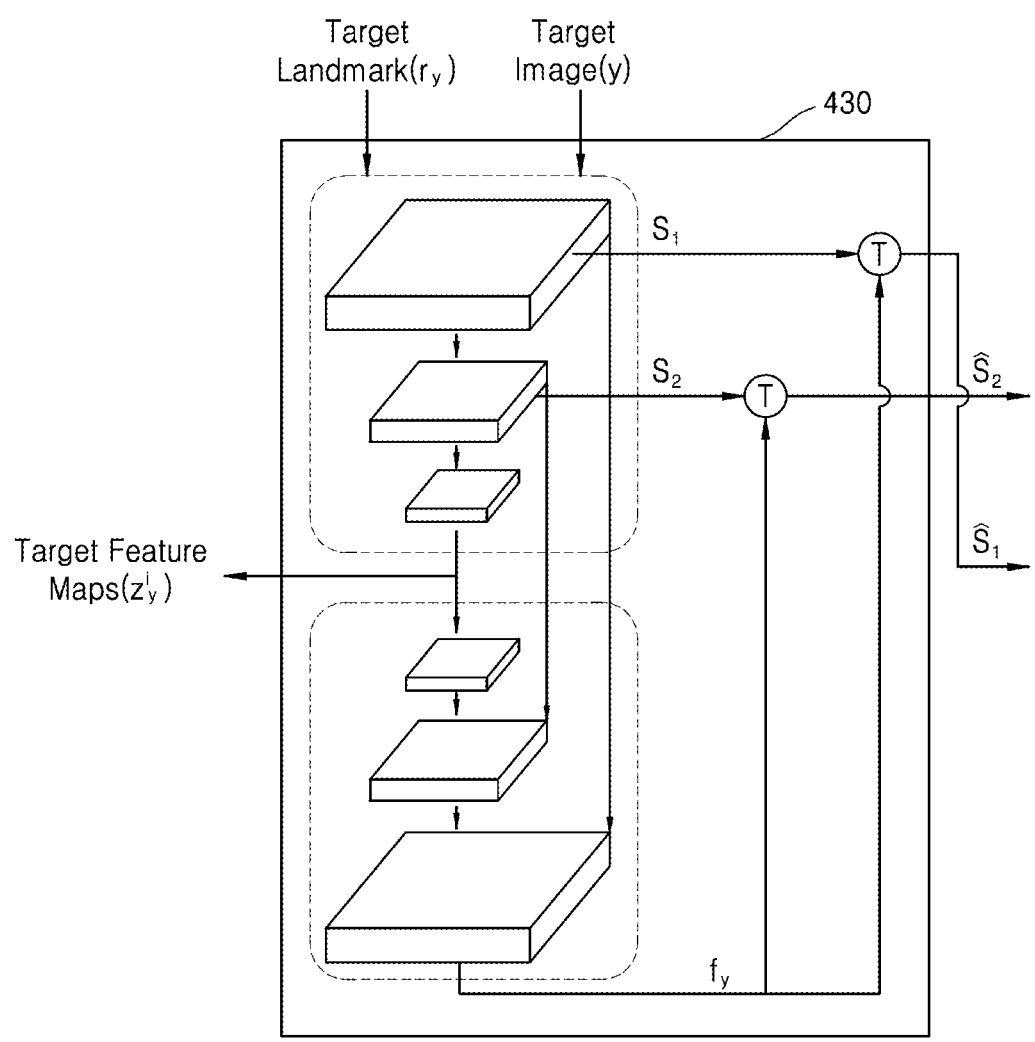
FIG. 8 is a diagram illustrating an example of operations of a second encoder, according to an embodiment.

FIG. 8 is a diagram illustrating an example of operations of the second encoder 430, according to an embodiment.

Referring to FIG. 8, the second encoder 430 generates a target feature map $z_y$ by using a target image y and a target landmark $r_y$ included in a two-dimensional landmark image. In addition, the second encoder 430 transforms the target feature map $Z_y$ into a normalized target feature map $\hat{S}$ through the warping function T.

For example, the second encoder 430 may adopt a U-Net architecture. U-Net is a U-shaped network that basically performs a segmentation function and has a symmetric shape.

In FIG. 8, $f_y$ denotes a normalization flow map used for normalizing a target feature map, and a warping function T denotes a function for performing warping. In addition, $S_j$ (here, j=1, . . . , $n_y$) denotes an encoded target feature map in each convolutional layer.

The second encoder 430 generates the encoded target feature map $S_j$ and the normalization flow map $f_y$ by using the rendered target landmark $r_y$ and the target image y. Then, the second encoder 33 generates the normalized target feature map $\hat{S}$ by applying the generated encoded target feature map $S_j$ and the normalized flow map $f_y$ to the warping function T.

Here, it may be understood that the normalized target feature map $\hat{S}$ is a pose-normalized target feature map. Accordingly, it may be understood that the warping function T is a function of normalizing pose information of a target face and generating data including only normalized pose information and a unique style of the target face (i.e., an identity landmark).

In summary, the normalized target feature map $\hat{S}$ may be expressed as Equation 12.

$$\hat{S} = \{T(S_1; f_y), \ldots, T(S_{n_y}; f_y)\} \quad \text{[Equation 12]}$$

Figure 9:
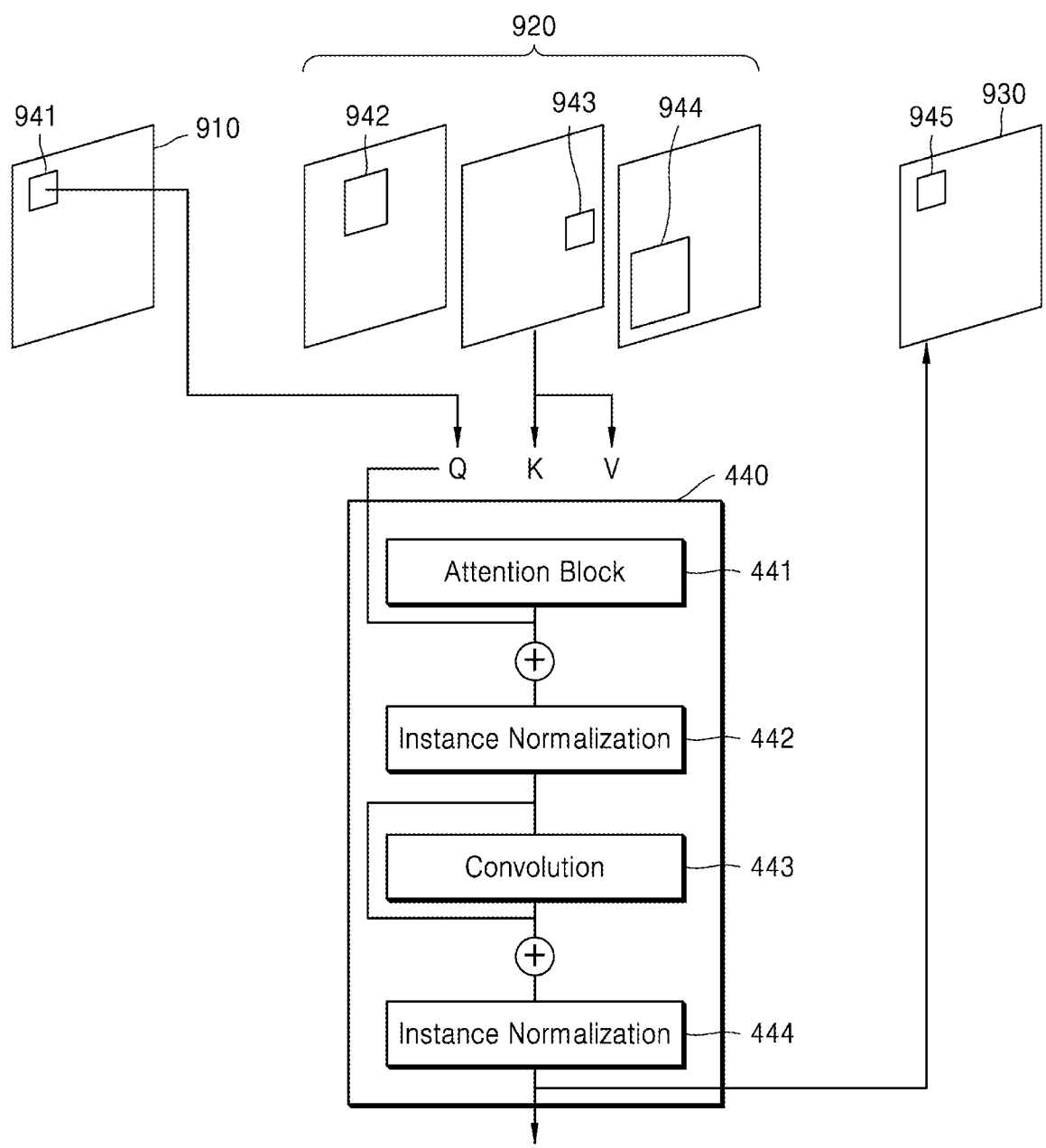
FIG. 9 is a diagram illustrating an example of operations of an image attention unit, according to an embodiment.

FIG. 9 is a diagram illustrating an example of operations of the image attention unit 440, according to an embodiment.

Referring to FIG. 9, spatial information of a target included in target feature maps 920 may be reflected in a mixed feature map 930 generated by the image attention unit 440.

To transfer style information of targets to the driver, previous studies encoded target information as a vector and mixed it with driver feature by concatenation or AdaIN layers. However, encoding targets as a spatial-agnostic vector leads to losing spatial information of targets. In addition, these methods are absent of innate design for multiple target images, and thus, summary statistics (e.g. mean, max) are used to deal with multiple targets which might cause losing details of the target. We suggest the image attention unit 440 to alleviate the aforementioned problem.

The image attention unit 440 generates the mixed feature map 930 by using a driver feature map 910 and the target feature maps 920. Here, the driver feature map 910 may serve as an attention query, and the target feature maps 920 may serve as attention memory.

Although one driver feature map 910 and three target feature maps 920 are illustrated in FIG. 9, the present disclosure is not limited thereto. In addition, regions, in which respective landmarks 941, 942, 943, and 944 are located in the feature maps 910 and 920 illustrated in FIG. 9 all represent a constant set of keypoints of one main part of a face.

The image attention unit 440 attends to appropriate positions of the respective landmarks 941, 942, 943, and 944 while processing the plurality of target feature maps 920. In other words, the landmark 941 of the driver feature map 910 and the landmarks 942, 943, and 944 of the target feature maps 920 correspond to a landmark 945 of the mixed feature map 930.

The driver feature map 910 and the target feature maps 920 input to the image attention unit 440 may include a landmark of a driver face and a landmark of a target face, respectively. In order to generate an image of the target face corresponding to the movement and expression of the driver face while preserving the identity of the target face, the image attention unit 440 may perform an operation of matching the landmark of the driver face with the landmark of the target face.

For example, in order to control the movement of the target face according to the movement of the driver face, the image attention unit 440 may link landmarks of the driver face, such as keypoints of the eyes, eyebrows, nose, mouth, and jawline, to landmarks of the target face, such as corresponding keypoints of the eyes, eyebrows, nose, mouth, and jawline, respectively. Moreover, in order to control the expression of the target face according to the expression of the driver face, the image attention unit 440 may link expression landmarks of the driver face, such as the eyes, eyebrows, nose, mouth, and jawline, to corresponding expression landmarks of the target face, such as the eyes, eyebrows, nose, mouth, and jawline, respectively.

For example, the image attention unit 440 may detect the eyes in the driver feature map 910, then detect the eyes in the target feature maps 920, and then generate the mixed feature map 930 such that the eyes of the target feature maps 920 reenact the movement of the eyes of the driver feature map 910. The image attention unit 440 may perform substantially the same operation on other feature points in the face.

The image attention unit 440 may generate the mixed feature map 930 by inputting pose information of the driver face and style information of the target face into an artificial neural network. For example, in an attention block 441, an attention may be calculated based on Equations 13 and 14.

$$Q = z_x W_q + P_x W_{qp} \in \mathbb{R}^{h_x \times w_x \times c_a}$$
$$K = z_y W_k + P_y W_{kp} \in \mathbb{R}^{K \times h_y \times w_y \times c_a}$$
$$V = Z_y W_v \in \mathbb{R}^{K \times h_y \times w_y \times c_x}$$
[Equation 13]

$$A(Q, K, V) = \mathrm{softmax}\left(\frac{f(Q)f(K)^T}{\sqrt{c_a}}\right) f(V)$$
[Equation 14]

In Equation 13, $z_x$ denotes the driver feature map 910 and satisfies $z_x \in \mathbb{R}^{h_x \times w_x \times c_x}$. In addition, $z_y$ denotes the target feature maps 920 and satisfies $Z_y = [z_y^1, \ldots, z_y^K] \in \mathbb{R}^{K \times h_y \times w_y \times c_y}$.

In Equation 14, f denotes a flattening function, which is f: $\mathbb{R}^{d_1 \times \ldots \times d_k \times c} \to \mathbb{R}^{(d_1 \times \ldots \times d_k) \times c}$. In addition, all W are linear projection matrices that map to an appropriate number of channels at the last dimension, and $P_x$ and $P_y$ are sinusoidal positional encodings that encode the coordinates of feature maps. Finally, the output $A(Q, K, V) \in \mathbb{R}^{(h_x \times w_x) \times c_x}$ is reshaped to $\mathbb{R}^{h_x \times w_x \times c_x}$.

For example, first, the attention block 441 divides the number of channels of the positional encoding in half. Then, the attention block 441 utilizes half of them to encode the horizontal coordinate and the rest of them to encode the vertical coordinate. To encode the relative position, the attention block 441 normalizes the absolute coordinate by the width and the height of the feature map. Thus, given a feature map of $z \in \mathbb{R}^{h_z \times w_z \times c_z}$, the corresponding positional encoding $P \in \mathbb{R}^{h_z \times w_z \times c_z}$, is computed as Equation 15.

$$P_{i,j,4k} = \sin\left(\frac{256i}{h_z \cdot 10000^{2k/c_z}}\right)$$
$$P_{i,j,4k+1} = \cos\left(\frac{256i}{h_z \cdot 10000^{2k/c_z}}\right)$$
$$P_{i,j,4k+2} = \sin\left(\frac{256j}{w_z \cdot 10000^{2k/c_z}}\right)$$
$$P_{i,j,4k+3} = \cos\left(\frac{256j}{w_z \cdot 10000^{2k/c_z}}\right)$$
[Equation 15]

The image attention unit 440 generates the mixed feature map 930 by using instance normalization layers 442 and 444, a residual connection, and a convolution layer 443. The image attention unit 440 provides a direct mechanism of transferring information from the plurality of target feature maps 920 to the pose of the driver face.

Figure 10:
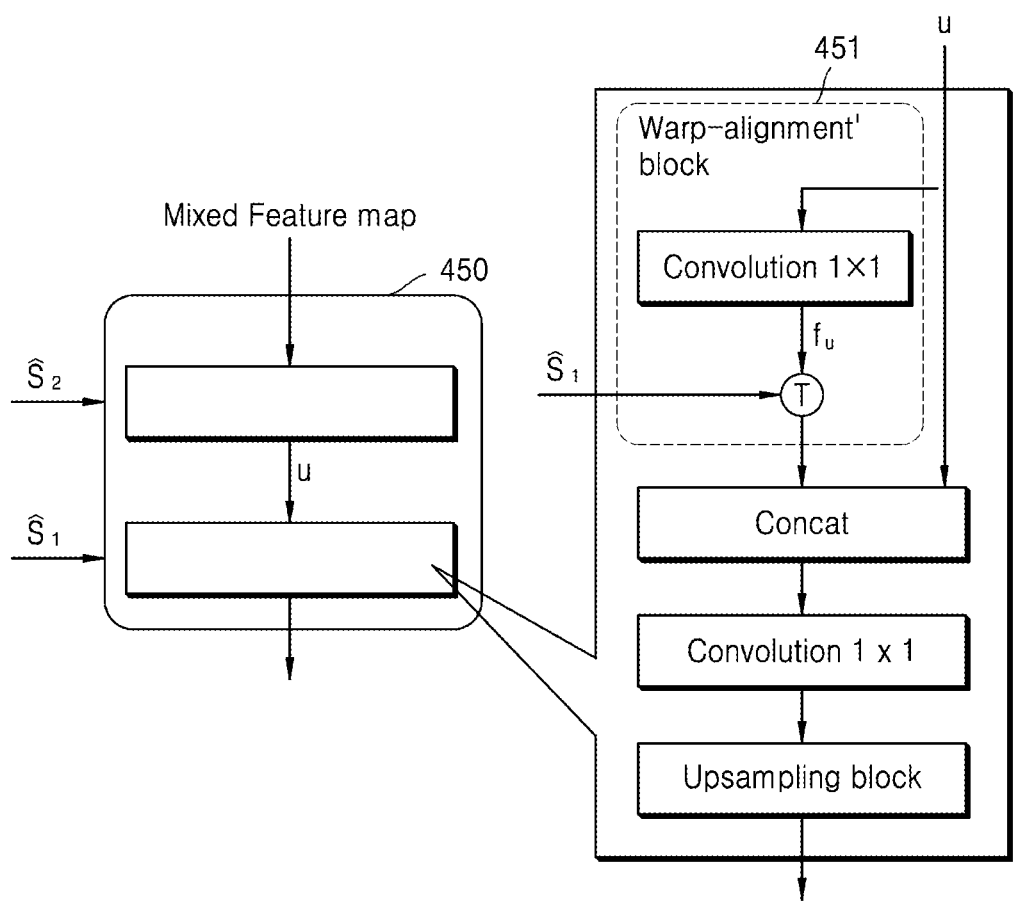
FIG. 10 is a diagram illustrating an example of operations of a decoder, according to an embodiment.

FIG. 10 is a diagram illustrating an example of operations of the decoder 450, according to an embodiment.

Referring to FIG. 10, the decoder 450 applies an expression landmark of a driver face to a target image by using a normalized target feature map Ŝ and a mixed feature map. As described above with reference to FIG. 8, the normalized target feature map S denotes a pose-normalized target feature map.

In FIG. 10, data input to each block of the decoder 450 is a normalized target feature map generated by the second encoder 430, and $f_u$ denotes a flow map for applying the expression landmark of the driver face to the normalized target feature map.

In addition, a warp-alignment block 451 of the decoder 450 applies a warping function T by using an output u of the previous block of the decoder 450 and the normalized target feature map. The warping function T may be used for generating a reenacted image in which the movement and pose of a driver face are transferred to a target face preserving its unique identity, and may differ from the warping function T applied in the second encoder 430.

In a few-shot setting, the decoder 450 averages resolution-compatible feature maps from different target images (i.e., $\hat{S}_j = \Sigma_i \hat{S}_j^i / K$). To apply pose-normalized feature maps to the pose of the driver face, the decoder 450 generates an estimated flow map of the driver face $f_u$ by using a 1×1 convolution block that takes u as an input. Then, alignment by $T(\hat{S}_j; f_u)$ may be performed, and the result of the alignment may be concatenated to u and then fed into a 1×1 convolution block and a residual upsampling block.

As described above with reference to FIGS. 3 to 10, based on a driver image and a target image, a reenacted image containing a face having the identity of a target face and the expression of a driver face may be generated.

Meanwhile, based on a target image, which is a static image, a dynamic image may be generated as a reenacted image. For example, when a target image is input, a dynamic image may be generated as a reenacted image by using an image transformation template. Here, the image transformation template may be pre-stored or input from an external source.

Hereinafter, an example in which a dynamic image is generated as a reenacted image will be described with reference to FIGS. 11 to 17.

Figure 11:
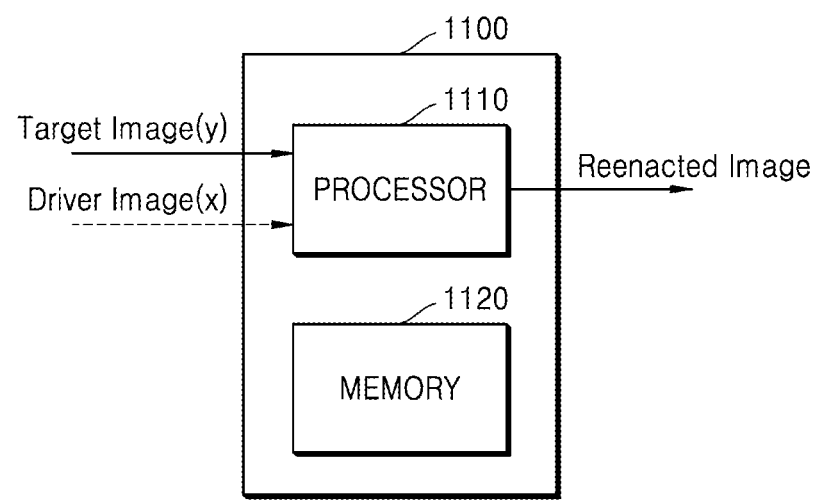
FIG. 11 is a configuration diagram illustrating an example of an apparatus for generating a dynamic image, according to an embodiment.

FIG. 11 is a configuration diagram illustrating an example of an apparatus 1100 for generating a dynamic image, according to an embodiment.

Referring to FIG. 11, the apparatus 1100 includes a processor 1110 and a memory 1120. FIG. 11 illustrates the apparatus 1100 including only components related to the present embodiment. Thus, it will be understood by one of skill in the art that other general-purpose components than those illustrated in FIG. 11 may be further included in the apparatus 1100.

The processor 1110 may be an example of the apparatus 400 described above with reference to FIG. 4. Therefore, it will be understood by one of skill in the art that the descriptions provided above with reference to FIGS. 3 to 10, including those omitted below, may be implemented by the processor 1110.

In addition, the apparatus 1100 may be included in the server 100 or the terminals 10 and 20 of FIG. 1. Accordingly, each component included in the apparatus 1100 may be configured by the server 100 and/or the terminals 10 and 20.

The processor 1110 receives a target image y. For example, the target image y may be a static image. The size of a target face captured in the target image y may vary, and for example, the size of the face captured in target image 1 may be 100×100 pixels, and the size of the face captured in target image 2 may be 200×200 pixels.

The processor 1110 extracts only a facial region from the target image y. For example, the processor 1110 may extract a region corresponding to the target face from the target image y, with a preset size. For example, when the preset size is 100×100 and the size of the facial region included in the target image is 200×200, the processor 1110 may reduce the facial image having a size of 200×200 into an image having a size of 100×100, and then extract the reduced region. Alternatively, the processor 1110 may extract the facial image having a size of 200×200 and then convert it into an image of a size of 100×100.

The processor 1110 may obtain at least one image transformation template. The image transformation template may be understood as a tool for transforming a target image into a new image of a specific shape. For example, when an expressionless face is captured in a target image, a new image in which the expressionless face is transformed into a smiling face may be generated by a specific image transformation template. For example, the image transformation template may be a dynamic image, but is not limited thereto.

The image transformation template may be an arbitrary template that is pre-stored in the memory 1120, or may be a template selected by a user from among a plurality of templates stored in the memory 1120. In addition, the processor 1110 may receive at least one driver image x and use the driver image x as an image transformation template. Accordingly, although omitted below, the image transformation template may be interpreted to be the same as the driver image x. For example, the driver image x may be a dynamic image, but is not limited thereto.

The processor 1110 may generate a reenacted image (e.g., a dynamic image) by transforming an image (e.g., a static image) of the facial region extracted from the target image y by using the image transformation template. An example in which the processor 1110 generates a reenacted image will be described below with reference to FIGS. 12 to 18.

Figure 12:
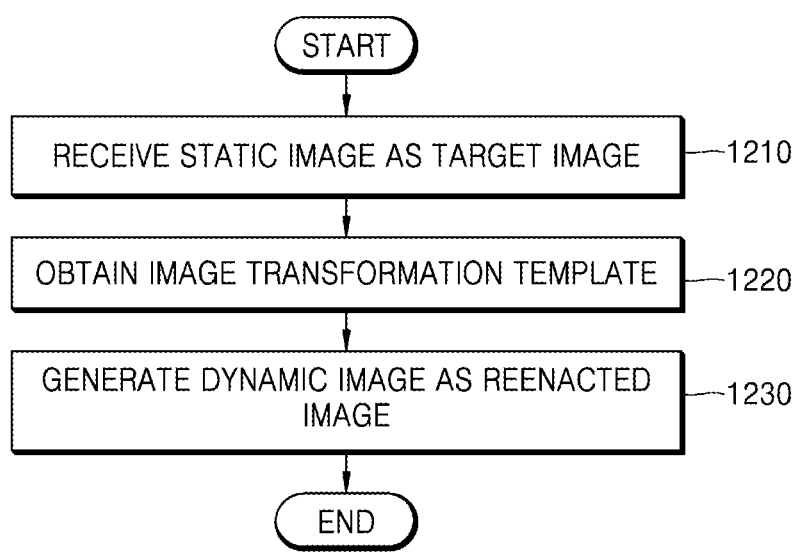
FIG. 12 is a flowchart of an example of a method of generating a reenacted image, according to an embodiment.

FIG. 12 is a flowchart of an example of a method of generating a reenacted image, according to an embodiment.

FIG. 12 illustrates a method, performed by the processor 1110 of FIG. 11, of generating a reenacted image. The processor 1110 may include an artificial neural network through which a reenacted image is generated.

In operation 1210, the processor 1110 receives a target image. Here, the target image may be a static image including a single frame.

In operation 1220, the processor 1110 obtains at least one image transformation template from among a plurality of image transformation templates pre-stored in the memory 1120. Alternatively, the image transformation template may be selected by a user from among the plurality of pre-stored image templates. For example, the image transformation template may be a dynamic image, but is not limited thereto.

Although not illustrated in FIG. 12, the processor 1110 may receive at least one driver image. For example, the driver image may be an image containing the face of a user or an image containing the face of another person. When the driver image is received, the processor 1110 may use the driver image as an image transformation template. That is, it may be understood that the driver image performs the same function as that of an image transformation template. For example, the driver image may be a dynamic image, but is not limited thereto.

In operation 1230, the processor 1110 may generate a dynamic image as a reenacted image by using the image transformation template. In other words, the processor 1110 may generate a dynamic image as a reenacted image by using the target image, which is a static image, and the image transformation template, which is a dynamic image.

For example, the processor 1110 may extract texture information from the face captured in the target image. For example, the texture information may be information about the color and visual texture of a face.

In addition, the processor 1110 may extract a landmark from a region corresponding to the face captured in the image transformation template. An example in which the processor 1110 extracts a landmark from an image transformation template is the same as described above with reference to FIGS. 4 to 7.

For example, a landmark may be obtained from a specific shape, pattern, color, or a combination thereof included in the face of a person, based on an image processing algorithm. Here, the image processing algorithm may include one of scale-invariant feature transform (SIFT), histogram of oriented gradient (HOG), Haar feature, Ferns, local binary pattern (LBP), and modified census transform (MCT), but is not limited thereto.

The processor 1110 may generate a reenacted image by using the texture information and the landmark. An example in which the processor 1110 generates a reenacted image is the same as described above with reference to FIGS. 4 to 10.

The reenacted image may be a dynamic image including a plurality of frames. For example, a change in the expression of the face captured in the image transformation template may be equally reproduced in the reenacted image. That is, at least one intermediate frame may be included between the first frame and the last frame of the reenacted image, the facial expression captured in each intermediate frame may gradually change, and the change in the facial expression may be the same as the change in the facial expression captured in the image transformation template.

The processor 1110 according to an embodiment may generate a reenacted image having the same effect as that of a dynamic image (e.g., an image transformation template) in which a user changing his/her facial expression is captured.

FIG. 13 is a diagram illustrating an example in which a reenacted image is generated, according to an embodiment.

FIG. 13 illustrates a target image 1310, a driver image 1320, and a reenacted image 1330. Here, the target image 1310 may be a static image including a single frame, and the driver image 1320 may be a dynamic image including a plurality of frames.

The driver image 1320 may be a dynamic image in which a facial expression and/or a pose of a person changes over time. For example, the driver image 1320 of FIG. 13 shows a face that changes from a smiling face with both eyes open to a winking face. As described above, the driver image 1320 may be a dynamic image in which a facial expression and/or a pose continuously change.

The person captured in the target image 1310 may be different from the person captured in the driver image 1320. Accordingly, the face captured in the driver image 1320 may be different from the face captured in the target image 1310. For example, by comparing the target face captured in the target image 1310 with the driver face captured in the driver image 1320 in FIG. 13, it may be seen that the faces are of different people.

The processor 1110 generates the reenacted image 1330 by using the target image 1310 and the driver image 1320. Here, the reenacted image 1330 may be a dynamic image. For example, the reenacted image 1330 may be an image in which a person corresponding to the target face makes a facial expression and/or a pose corresponding to the driver face. That is, the reenacted image 1330 may be a dynamic image in which the facial expression and/or the pose of the driver face continuously change.

In the reenacted image 1330 of FIG. 13, the shape of the face, the shape, and arrangement of the eyes, nose, mouth, etc. are the same as those of the target face. That is, the person created in the reenacted image 1330 may be the same as the person captured in the target image 1310. However, the change in the facial expression in the reenacted image 1330 is the same as that of the driver face. That is, the change in the facial expression in the reenacted image 1330 may be the same as the change in the facial expression in the driver image 1320. Thus, the reenacted image 1330 shows as if the person captured in the target image 1310 is imitating the change in the facial expression and/or the change in the pose captured in the driver image 1320.

Figure 14:
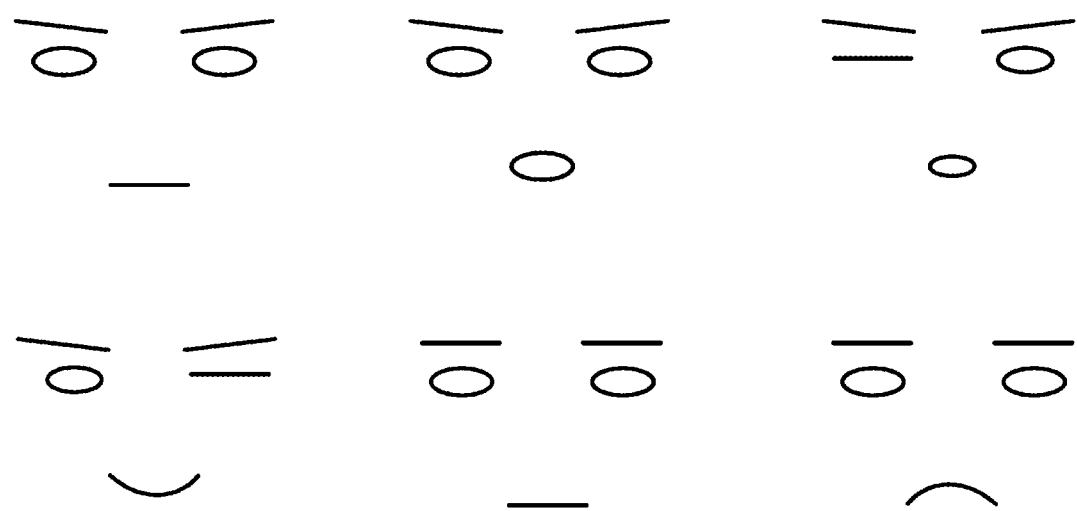
FIG. 14 is a diagram illustrating examples of an image transformation template, according to an embodiment.

FIG. 14 is a diagram illustrating an example of facial expressions shown in image transformation templates, according to an embodiment.

As described above with reference to FIG. 11, a plurality of image transformation templates may be stored in the memory 1120. Each of the plurality of image transformation templates may include an outline image corresponding to eyebrows, eyes, and a mouth.

The facial expression shown in each image transformation template may correspond to one of various facial expressions such as a sad expression, a happy expression, a winking expression, a depressed expression, a blank expression, a surprised expression, an angry expression, and the image transformation templates include information about different facial expressions. Various facial expressions correspond to different outline images, respectively. Accordingly, the image transformation templates may include different outline images, respectively.

The processor 1110 may extract a landmark from the image transformation template. For example, the processor 1110 may extract an expression landmark corresponding to the facial expression shown in the image transformation template.

Figure 15:
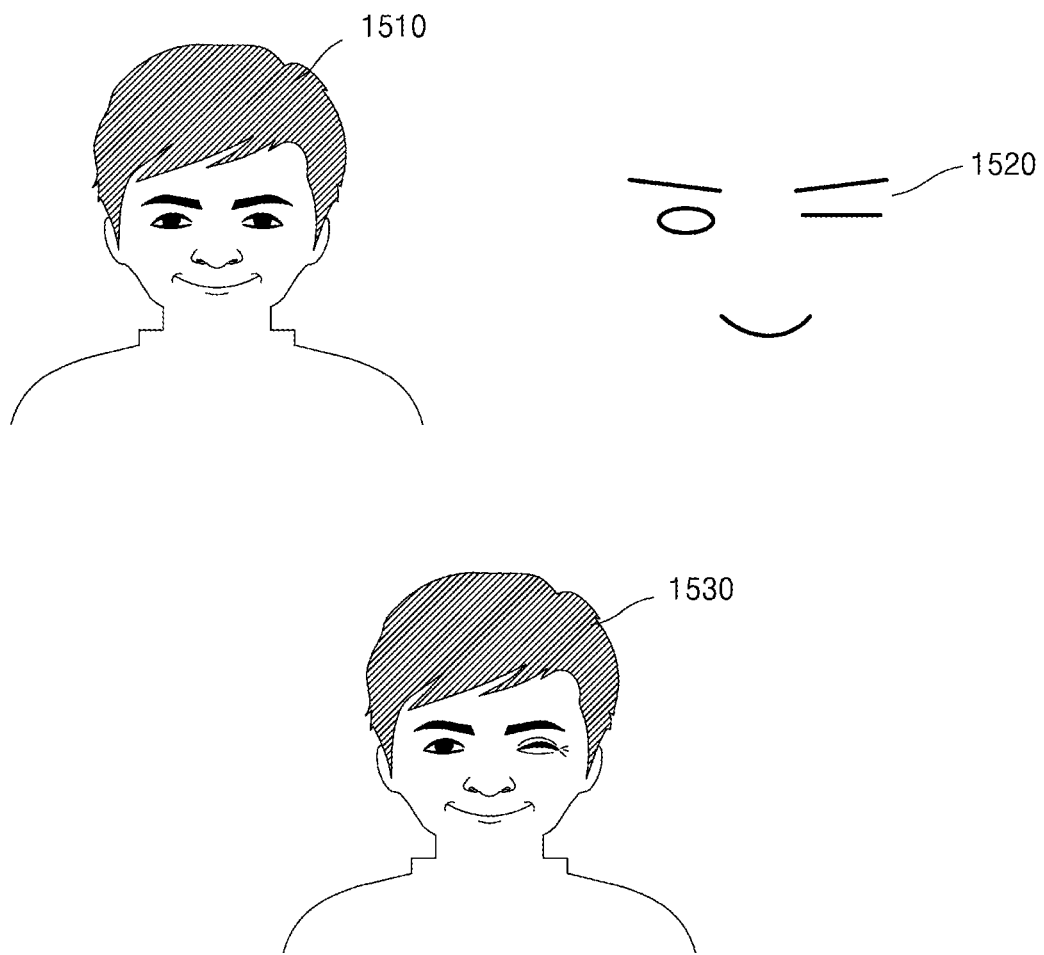
FIG. 15 is a diagram illustrating an example in which a processor generates a dynamic image, according to an embodiment.

FIG. 15 is a diagram illustrating an example in which a processor generates a dynamic image, according to an embodiment.

FIG. 15 illustrates a target image 1510, a facial expression 1520 shown in an image transformation template, and a reenacted image 1530 are illustrated.

For example, the target image 1510 may contain a smiling face. The facial expression 1520 shown in the image transformation template may include an outline corresponding to the eyebrows, eyes, and mouth of a winking and smiling face.

The processor 1110 may extract texture information of a region corresponding to the face from the target image 1510. Also, the processor 1110 may extract a landmark from the facial expression 1520 shown in the image transformation template. In addition, the processor 1110 may generate the reenacted image 1530 by combining the texture information of the target image 1510 and the landmark of the facial expression 1520 shown in the image transformation template.

FIG. 15 illustrates that the reenacted image 1530 includes a single frame containing a winking face. However, the reenacted image 1530 may be a dynamic image including a plurality of frames. An example in which the reenacted image 1530 includes a plurality of frames will be described with reference to FIG. 16.

Figure 16:
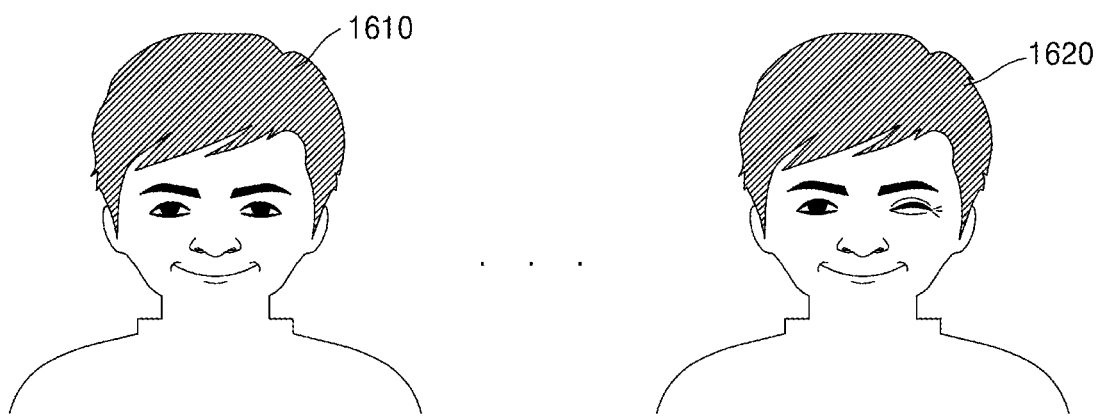
FIG. 16 is a diagram illustrating an example of a reenacted image according to an embodiment.

FIG. 16 is a diagram illustrating an example of a reenacted image according to an embodiment.

Referring to FIGS. 15 and 16, at least one frame may be present between a first frame 1610 and a last frame 1620 of the reenacted image 1530. For example, the target image 1510 may correspond to the first frame 1610. In addition, the reenacted image 1530 illustrated in FIG. 15 may correspond to the last frame 1620.

Here, each of the at least one frame between the first frame 1610 and the last frame 1620 may be an image showing the face with the right eye being gradually closed.

Figure 17:
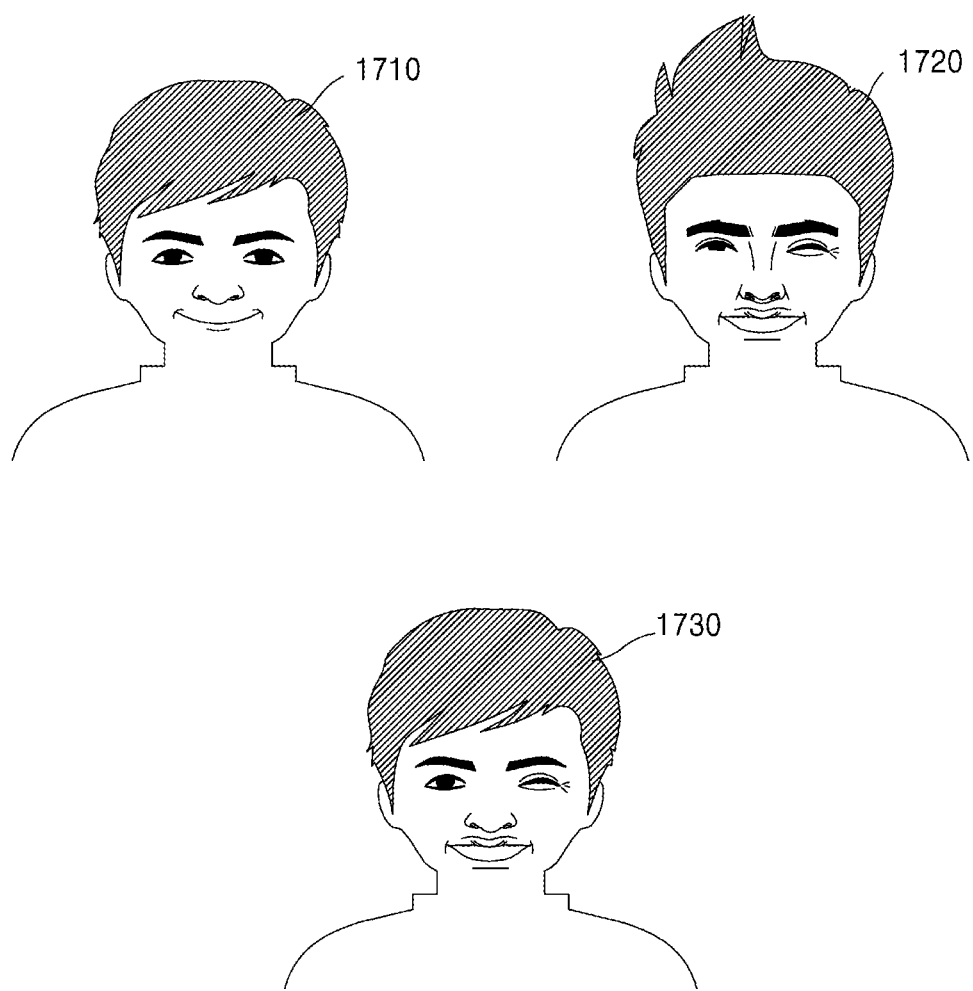
FIG. 17 is a diagram illustrating another example in which a processor generates a dynamic image, according to an embodiment.

FIG. 17 is a diagram illustrating another example in which a processor generates a dynamic image, according to an embodiment.

FIG. 17 illustrates a target image 1710, an image transformation template 1720, and a reenacted image 1730 generated by using the target image 1710 and the image transformation template 1720. In FIG. 17, the target image 1710 shows a smiling face, and the image transformation template 1720 shows a winking face with a big smile. The face of a person other than the person shown in the target image 1710 may be shown in the image transformation template 1720.

It may be understood that the reenacted image 1730 illustrated in FIG. 17 is the last frame of a dynamic image generated by the processor 1110.

The processor 1110 may extract texture information of a region corresponding to the face from the target image 1710. Also, the processor 1110 may extract a landmark from the image transformation template 1720. For example, the processor 1110 may extract the landmark from regions corresponding to the eyebrows, eyes, and mouth in the face shown in the image transformation template 1720. The processor 1110 may generate the reenacted image 1730 by combining the texture information of the target image 1710 and the landmark of the image transformation template 1720.

FIG. 17 illustrates that the reenacted image 1730 includes a single frame containing a winking face with a big smile. However, the reenacted image 1730 may be a dynamic image including a plurality of frames. An example in which the reenacted image 1730 includes a plurality of frames will be described with reference to FIG. 18.

Figure 18:
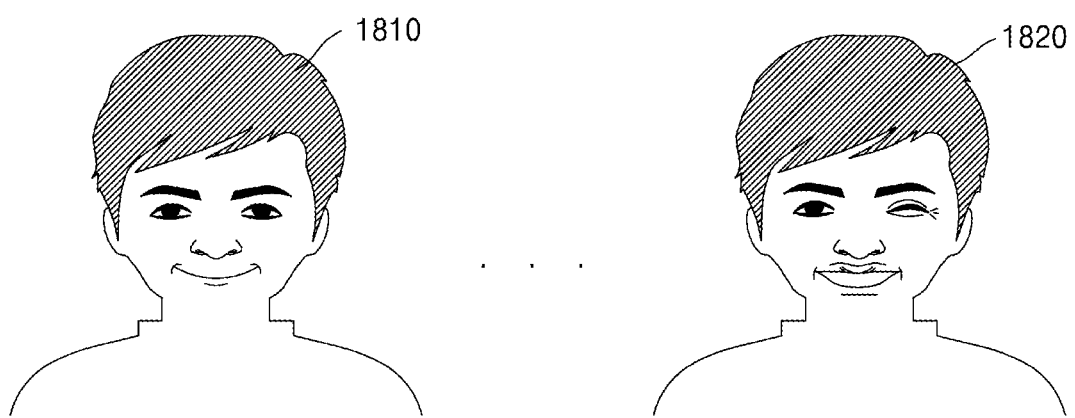
FIG. 18 is a diagram illustrating another example of a reenacted image according to an embodiment.

FIG. 18 is a diagram illustrating another example of a reenacted image according to an embodiment.

Referring to FIGS. 17 and 18, at least one frame may be present between a first frame 1810 and a last frame 1820 of the reenacted image 1730. For example, the target image 1710 may correspond to the first frame 1810. In addition, the image containing the winking face with a big smile may correspond to the last frame 1820.

Each of the at least one frame between the first frame 1810 and the last frame 1820 of the reenacted image 1730 may include an image showing the face with the right eye being gradually closed and the mouth being gradually open.

As described above, the apparatus 400 may generate a reenacted image containing a face having the identity of a target face and the expression of a driver face, by using a driver image and a target image. Also, the apparatus 400 may accurately separate a landmark even from a small number of images (i.e., in a few-shot setting). Furthermore, the apparatus 400 may separate, from an image, a landmark including more accurate information about the identity and expression of a face shown in the image.

In addition, the apparatus 1100 may generate a reenacted image showing the same facial expression as that captured in a dynamic image in which a user changing his/her facial expression is captured.

Meanwhile, the above-described method may be written as a computer-executable program, and may be implemented in a general-purpose digital computer that executes the program by using a computer-readable recording medium. In addition, the structure of the data used in the above-described method may be recorded in a computer-readable recording medium through various means. Examples of the computer-readable recording medium include magnetic storage media (e.g., read-only memory (ROM), random-access memory (RAM), universal serial bus (USB), floppy disks, hard disks, etc.), and optical recording media (e.g., compact disc-ROM (CD-ROM), digital versatile disks (DVDs), etc.).

According to an embodiment of the present disclosure, a reenacted image containing a face having the identity of a target face and the expression of a driver face may be generated by using a driver image and a target image. In addition, a landmark may be accurately separated even from a small number of images (i.e., in a few-shot setting). Furthermore, a landmark including more accurate information about the identity and expression of a face shown in an image may be separated.

In addition, a user may generate, without directly capturing a dynamic image by himself/herself, a reenacted image having the same effect as that in a dynamic image in which the user changing their facial expression is captured.

It will be understood by one of skill in the art that the disclosure may be implemented in a modified form without departing from the intrinsic characteristics of the descriptions provided above. The methods disclosed herein are to be considered in a descriptive sense only, and not for purposes of limitation, and the scope of the present disclosure is defined not by the above descriptions, but by the claims and their equivalents, and all variations within the scope of the claims and their equivalents are to be construed as being included in the present disclosure.

What is claimed is:

1. A method of transforming a landmark, the method comprising:
   receiving an input image including a facial image of a first person and a facial landmark corresponding to the facial image;
   estimating a transformation matrix corresponding to the facial landmark;
   calculating, using the transformation matrix:
     an expression landmark corresponding to the input image, wherein the expression landmark is related to a facial expression of the first person, and
     an identity landmark corresponding to the input image, wherein the identity landmark is related to a unique identity of the first person; and
   expressing the facial landmark as a sum of:
     the expression landmark;
     the identity landmark; and
     an average landmark related to an average identity of human faces.

2. The method of claim 1, wherein estimating the transformation matrix comprises using a learning model trained to estimate a principal component analysis (PCA) transformation matrix from an arbitrary facial image and a landmark corresponding to the arbitrary facial image.

3. The method of claim 2, wherein the learning model:
   classifies a plurality of landmarks into a plurality of semantic groups, and
   outputs a PCA transformation coefficient corresponding to each of the plurality of semantic groups.

4. The method of claim 3, wherein calculating the expression landmark is performed using the transformation matrix and a PCA unit vector.

5. The method of claim 1, wherein the identity landmark comprises at least one of: texture information corresponding to the facial image, color information corresponding to the facial image, or shape information corresponding to the facial image.

6. The method of claim 1, wherein calculating the identity landmark comprises computing the expression landmark and the average landmark from the facial landmark.

7. The method of claim 1, wherein:
   the expression landmark comprises expression information on at least one of: an eye of the facial image, a nose of the facial image, a mouth of the facial image, a facial contour of the facial image; or the facial image in entirety; and
   the expression information corresponds to at least one of: position, angle, movement, inclination, or direction.

8. A landmark generating apparatus comprising:
   a memory; and
   at least one processor, the at least one processor configured to:
     receive an input image including a facial image of a first person and a facial landmark corresponding to the facial image;
     estimate a transformation matrix corresponding to the facial landmark;
     calculate an expression landmark and an identity landmark corresponding to the input image, wherein the identity landmark is related to a unique identity of the first person; and
     express the facial landmark as a sum of:
       the expression landmark;
       the identity landmark; and
       an average landmark related to an average identity of human faces.

9. The landmark generating apparatus of claim 8, wherein the at least one processor estimates the transformation matrix by using a learning model trained to estimate a principal component analysis (PCA) transformation matrix from an arbitrary facial image and a landmark corresponding to the arbitrary facial image.

10. The landmark generating apparatus of claim 9, wherein the learning model:
    classifies a plurality of landmarks into a plurality of semantic groups, and
    outputs a PCA transformation coefficient corresponding to each of the plurality of semantic groups.

11. The landmark generating apparatus of claim 10, wherein the at least one processor is configured to use the transformation matrix and a PCA unit vector to calculate an expression landmark corresponding to the facial image of the first person.

12. The landmark generating apparatus of claim 8, wherein:
    the expression landmark comprises expression information on at least one of: an eye of the facial image, a nose of the facial image, a mouth of the facial image, a facial contour of the facial image; or the facial image in entirety;

the expression information corresponds to at least one of: position, angle, movement, inclination, or direction; and the identity landmark comprises at least one of: texture information corresponding to the facial image, color information corresponding to the facial image, or shape information corresponding to the facial image.

13. The landmark generating apparatus of claim 8, wherein the at least one processor is configured to calculate the identity landmark by computing the expression landmark and the average landmark from the facial landmark.

14. A non-transitory computer-readable recording medium having recorded thereon a program for performing a process comprising:
receiving an input image including a facial image of a first person and a facial landmark corresponding to the facial image;
estimating a transformation matrix corresponding to the facial landmark;
calculating, using the transformation matrix:
an expression landmark corresponding to the input image, wherein the expression landmark is related to a facial expression of the first person, and
an identity landmark corresponding to the input image, wherein the identity landmark is related to a unique identity of the first person; and
expressing the facial landmark as a sum of:
the expression landmark;
the identity landmark; and
an average landmark related to an average identity of human faces.

15. The non-transitory computer-readable recording medium of claim 14, wherein estimating the transformation matrix comprises using a learning model trained to estimate a principal component analysis (PCA) transformation matrix from an arbitrary facial image and a landmark corresponding to the arbitrary facial image.

16. The non-transitory computer-readable recording medium of claim 15, wherein the learning model:
classifies a plurality of landmarks into a plurality of semantic groups, and
outputs a PCA transformation coefficient corresponding to each of the plurality of semantic groups.

17. The non-transitory computer-readable recording medium of claim 16, wherein calculating the expression landmark is performed using the transformation matrix and a PCA unit vector.

18. The non-transitory computer-readable recording medium of claim 14, wherein the identity landmark comprises at least one of: texture information corresponding to the facial image, color information corresponding to the facial image, or shape information corresponding to the facial image.

19. The non-transitory computer-readable recording medium of claim 14, wherein calculating the identity landmark comprises computing the expression landmark and the average landmark from the facial landmark.

20. The non-transitory computer-readable recording medium of claim 14, wherein:
the expression landmark comprises expression information on at least one of: an eye of the facial image, a nose of the facial image, a mouth of the facial image, a facial contour of the facial image; or the facial image in entirety; and
the expression information corresponds to at least one of: position, angle, movement, inclination, or direction.

* * * * *